United States Patent
Ayhan et al.

(10) Patent No.: US 12,488,695 B2
(45) Date of Patent: Dec. 2, 2025

(54) MACHINE LEARNING SYSTEM FOR SOUND EXPOSURE LEVEL PREDICTION

(71) Applicant: The Boeing Company, Chicago, IL (US)

(72) Inventors: Samet M. Ayhan, Fairfax, VA (US); Mikhail Y. Danilin, Bellevue, WA (US)

(73) Assignee: The Boeing Company, Chicago, IL (US)

(*) Notice: Subject to any disclaimer, the term of this patent is extended or adjusted under 35 U.S.C. 154(b) by 853 days.

(21) Appl. No.: 17/805,389

(22) Filed: Jun. 3, 2022

(65) Prior Publication Data

US 2023/0394977 A1   Dec. 7, 2023

(51) Int. Cl.
*G08G 5/30* (2025.01)
*G08G 5/72* (2025.01)
*G08G 5/76* (2025.01)

(52) U.S. Cl.
CPC .............. *G08G 5/30* (2025.01); *G08G 5/727* (2025.01); *G08G 5/76* (2025.01)

(58) Field of Classification Search
CPC .......... G05D 2101/15; G05D 2105/22; G05D 2107/13; G05D 2109/22; G10K 11/16; H04R 3/005; G06F 3/16; G06N 20/00; G06N 20/10; G06N 20/20; G06N 3/006; G06N 3/045; G06N 3/08; G06N 5/01; G06N 5/04; G06N 7/01; G08G 5/00; G08G 5/22; G08G 5/26; G08G 5/30; G08G 5/32; G08G 5/34; G08G 5/50; G08G 5/55; G08G 5/727; G08G 5/76

USPC ............................................ 700/94
See application file for complete search history.

(56) References Cited

U.S. PATENT DOCUMENTS

| | | |
|---|---|---|
| 8,311,686 B2 | 11/2012 | Herkes et al. |
| 9,310,204 B2 | 4/2016 | McGregor et al. |
| 11,157,867 B1 * | 10/2021 | Jordan ................... G05D 1/104 |
| 11,244,572 B2 | 2/2022 | Villa et al. |
| 11,741,755 B2 | 8/2023 | Ko et al. |
| 11,804,207 B1 | 10/2023 | Salter et al. |
| 11,900,818 B2 | 2/2024 | Rostamzadeh et al. |
| 2011/0046818 A1 | 2/2011 | Herkes et al. |
| 2019/0340933 A1 * | 11/2019 | Villa .................... B64C 29/0016 |
| 2020/0388166 A1 * | 12/2020 | Rostamzadeh .......... G06N 5/04 |
| 2021/0012669 A1 * | 1/2021 | Beaurepaire ............. G08G 5/21 |

(Continued)

OTHER PUBLICATIONS

George Ho, Autoregressive Models in Deep Learning—A Brief Survey (https://www.georgeho.org/deep-autoregressive-models/) ( last accessed May 1, 2024) (Mar. 9, 2019).

(Continued)

*Primary Examiner* — Alexander Krzystan
*Assistant Examiner* — Sean M Rinehart
(74) *Attorney, Agent, or Firm* — Yee & Associates, P.C.

(57) ABSTRACT

A method, apparatus, system, and computer program product for predicting a sound exposure level generated by an aircraft. A flight path over a location is identified. The sound exposure level generated by an aircraft for the identified flight path over the location is predicted using a machine learning model trained using a training dataset comprising historical aircraft sensor data for selected parameters, historical atmospheric data, and historical sound data recorded by a microphone system for flight paths over the location.

28 Claims, 15 Drawing Sheets

(56) References Cited

U.S. PATENT DOCUMENTS

| | | |
|---|---|---|
| 2021/0034846 A1 | 2/2021 | Ko et al. |
| 2022/0114506 A1* | 4/2022 | Villa ............... G06Q 10/20 |
| 2022/0292350 A1* | 9/2022 | Nakamura ............ G06N 20/10 |
| 2023/0221173 A1* | 7/2023 | Sidiropoulos ............ G08G 5/26 381/56 |
| 2023/0351996 A1 | 11/2023 | Salter et al. |

OTHER PUBLICATIONS

Office Action dated May 13, 2024, regarding U.S. Appl. No. 17/805,371, 22 pages.

Office Action dated May 8, 2024, regarding U.S. Appl. No. 17/805,403, 36 pages.

Thomas Wood, What is Backpropagation? (https://web.archive.org/web/20210901211049/ https://deepai.org/ machine-learning-glossary-and-terms/backpropagation) (last accessed May 3, 2024) (Sep. 12, 2021).

US Dep't of Transp. FAA, Aviation Environmental Design Tool, Technical Manual, Version 2a (Jan. 2014).

Notice of Allowance, dated Sep. 12, 2024, regarding U.S. Appl. No. 17/805,403, 17 pages.

Lee et al., Aviation Environmental Design Tool (AEDT): Technical Manual, Version 3b, Volpe National Transportation System Center, Sep. 6, 2019, 468 pages.

Lopes et al., "Design of the Next Generation Aircraft Noise Prediction Program: ANOPP2," 17th AIAA/CEAS Aeroacoustics Conference (32nd AIAA Aeroacoustics Conference), Jun. 2011, 17 pages.

Ayhan et al., "Machine Learning System for Maximum Sound Pressure Level Prediction," U.S. Appl. No. 17/805,371, filed Jun. 3, 2022, 79 pages.

Ayhan et al., "Deep Learning System for Real Time Maximum Sound Pressure Level Prediction," U.S. Appl. No. 17/805,403, filed Jun. 3, 2022, 107 pages.

Notice of Allowance dated Aug. 14, 2024, regarding U.S. Appl. No. 17/805,371, 10 pages.

* cited by examiner

MACHINE LEARNING SYSTEM FOR SOUND EXPOSURE LEVEL PREDICTION

CROSS-REFERENCE TO RELATED APPLICATIONS

This application is related to the following patent applications entitled "MACHINE LEARNING SYSTEM FOR MAXIMUM SOUND PRESSURE LEVEL PREDICTION", application Ser. No. 17/805,371, filed Jun. 3, 2022, and issued as U.S. Pat. No. 12,175,875 on Dec. 24, 2024; and "DEEP LEARNING SYSTEM FOR REAL TIME MAXIMUM SOUND PRESSURE LEVEL PREDICTION", application Ser. No. 17/805,403, filed Jun. 3, 2022, issued as U.S. Pat. No. 12,192,714 on Jan. 7, 2025 and assigned to the same assignee. The aforementioned applications are incorporated herein by reference in their entirety.

BACKGROUND INFORMATION

1. Field

The present disclosure relates generally to managing aircraft noise and in particular, to a method and system to predict sound exposure levels for aircraft arrivals and departures.

2. Background

Aircraft arriving at airports and aircraft departing from airports produce noise levels that can disturb communities surrounding the airport. Significant decreases have been made in the noise caused by aircraft in the past few decades. However, improvements and navigation techniques have resulted in aircraft overflowing some communities with increased frequency. This change has resulted in complaints from communities at locations on departure and arrival flight tracks.

In response to these complaints, many countries have enacted regulations to control aircraft noise. For example, the Federal Aviation Administration (FAA) regulates the maximum amount of noise that an individual civil aircraft can produce during takeoff and landing and near airports. Air navigation service providers (ANSPs) across the world are making efforts to enforce noise-reduced arrival and departure procedures and penalizing airlines for their flights that produce noise above mandated thresholds.

The measurement of noise can be made in a number of different ways. For example, sound can have a sound exposure level (SEL). The sound exposure level occurs from the time when the sound level first exceeds a sound threshold to the time when the sound level drops below the same sound threshold. Sound exposure level (SEL) is a measure of energy that takes into account both received level and duration of exposure.

Sound exposure level (SEL) is normalized to a one second duration and does not measure instantaneous intensity despite the fact that sound exposure level is expressed in decibels. As a result, sound exposure level can be a common metric because it allows sound exposures of different durations to be related to one another in terms of total acoustic energy. In contrast to a measurement of maximum pressure (LAmax) which shows the peak value of a noise event, the sound exposure level (SEL) is a normalized integral value of this event.

Noise events with sound exposure levels can be measured by microphones located at the airport. These measurements can be made for both arrivals and departures of aircraft.

Regulations can specify noise reduced arrival and departure procedures along with thresholds for the sound exposure level. Airlines can be penalized for the arrival and departure of flights at airports that produce noise above the specified thresholds for the sound exposure levels.

SUMMARY

An embodiment of the present disclosure provides a method that predicts a sound exposure level generated by an aircraft. A set of machine learning models are trained to predict the sound exposure level generated by the aircraft for a flight path over a location using a training dataset comprising historical aircraft sensor data for selected parameters, historical atmospheric data, and historical sound data recorded by a microphone system for flight paths over the location. The sound exposure level generated by the aircraft for the flight path over the location is predicted using the set of machine learning models after training the set of machine learning models using the training dataset.

In another embodiment of the present disclosure, a method predicts a sound exposure level generated by an aircraft. A flight path over a location is identified. The sound exposure level generated by the aircraft for the identified flight path over the location is predicted using a machine learning model trained using a training dataset comprising historical aircraft sensor data for selected parameters, historical atmospheric data, and historical sound data recorded by a microphone system for flight paths over the location.

In yet another embodiment of the present disclosure, a sound exposure level prediction system comprises a computer system and a sound exposure level predictor in the computer system. The sound exposure level predictor trains a set of machine learning models to predict a sound exposure level generated by an aircraft for a flight path over a location using a training dataset comprising historical aircraft sensor data for selected parameters, historical atmospheric data, and historical sound data recorded by a microphone system for flight paths over the location. The sound exposure level predictor predicts the sound exposure level generated by the aircraft for the flight path over the location using the set of machine learning models after training the set of machine learning models using the training dataset.

In still another embodiment of the present disclosure, a computer program product predicts a sound exposure level generated by an aircraft. The computer program product comprises a computer readable storage medium having program instructions embodied therewith. The program instructions are executable by a computer system to cause the computer system to perform a method that identifies a flight path over a location; and predicts the sound exposure level generated by the aircraft for the flight path over the location using a machine learning model trained using a training dataset comprising historical aircraft sensor data for selected parameters, historical atmospheric data, and historical sound data recorded by a microphone system for flight paths over the location.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
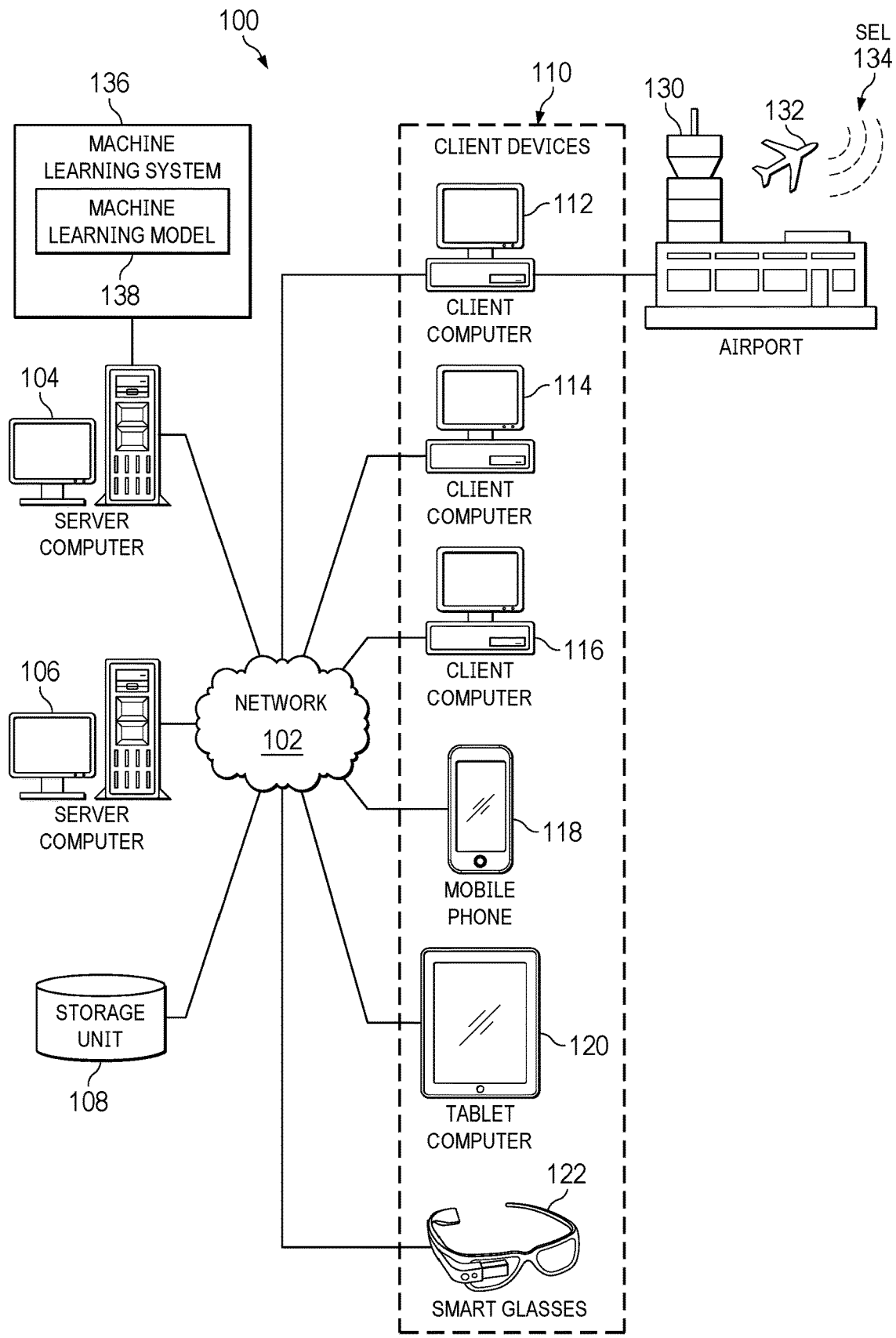
FIG. 1 is a pictorial representation of a network of data processing systems in which illustrative embodiments can be implemented.

The illustrative embodiments recognize and take into account one or more different considerations as described herein. For airlines to comply with these requirements, airlines need to be able to accurately predict noise for their arriving and departing flights. Additionally, air navigation service providers need be able to accurately predict noise for flights so that the air navigation service providers can generate noise-reduced arrival and departure procedures and enforce noise mitigated arrivals and departures.

Being able to accurately predict the sound exposure level for an arriving or departing flight in the vicinity of airport can be used to improve the impact of aircraft noise on the environment for locations around the airport. Further, with ability to predict sound exposure levels for arriving and departing flights, airlines can plan and use flight paths that have sound exposure levels that are lower to avoid penalties imposed by air navigation service providers. Further, with the ability to accurately predict sound exposure levels, air navigation service providers can generate noise reduced arrival and departure procedures.

Currently, various approaches are present for predicting noise for flights. One approach is the FAA Aviation Environmental Design Tool (AEDT). This tool uses the noise-power distance (NPD) curves that provide noise levels measured at various distances from a particular aircraft and engine configuration for different thrust settings and operational modes.

Although this approach is relatively numerically efficient and consistent with noise certification values, this approach cannot capture noise propagation effects for different weather conditions and aircraft configurations. As a result, the accuracy of AEDT is not as great as desired.

Another approach is a semi-empirical, physics-based approximation model employed by the Aircraft Noise Prediction Program (ANOPP). This model computes noise levels from the airframe and engine components at a user-defined three-dimensional observer grid for an arbitrary flight procedure. This model can be continuously updated with historical noise data and applies parametric and component models to separately simulate each relevant noise source.

Although this approach is relatively accurate, it is time consuming and compute intensive. This approach also suffers from lack of robust validation and verification for each relevant noise source. ANOPP is a semi-empirical and physics-based system in which human operators formulate the solution using only several parameters for a limited number of cases.

Thus, illustrative examples employ machine learning models that are unbiased and can utilize large amounts of data. These machines learning models can also consider all regular and irregular edge cases formulating a solution with as many parameters that are available. The illustrative examples provide a more accurate and efficient manner to predict sound exposure levels through the use of machine learning models as compared to current techniques for predicting sound exposure levels.

With reference now to the figures and, in particular, with reference to FIG. 1, a pictorial representation of a network of data processing systems is depicted in which illustrative embodiments can be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage media and downloaded to a data processing system or other device for use. For example, program instructions can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

This illustrative example, client computer 112 is a client device in client devices 110 located at or in communication with airport 130. As depicted, commercial airplane 132 can arrive and takeoff from airport 130. Commercial airplane 132 generates noise that can be measured using the metric, sound exposure level (SEL) 134. In the illustrative example, SEL 134 is a sound exposure level that commercial airplane 132 generates during flight over airport 130. This flight can be for an arriving flight or a departing flight from airport 130 in this illustrative example.

In this illustrative example, machine learning system 136 comprises machine learning model 138 that operates to predict SEL 134 as commercial airplane 132 flies over airport 130 when arriving or taking off.

In this illustrative example, machine learning model 138 has been trained to predict noise in the form of SEL 134 using training dataset that includes historical aircraft sensor data, historical atmospheric data, and historical sound data.

Figure 2:
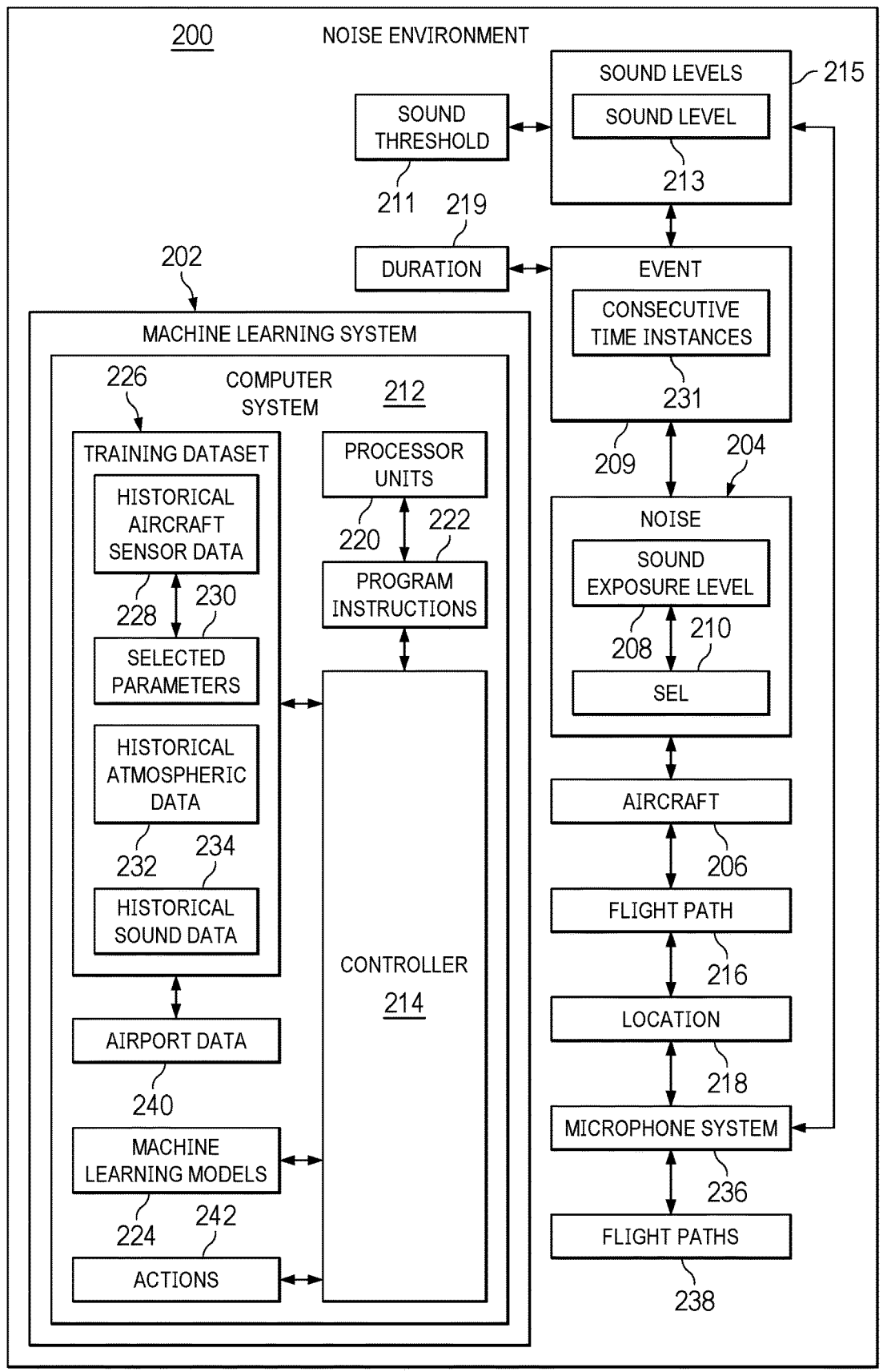
FIG. 2 is a block diagram of a noise environment in accordance with an illustrative embodiment.

With reference now to FIG. 2, a block diagram of a noise environment is depicted in accordance with an illustrative embodiment. In this illustrative example, noise environment 200 includes components that can be implemented in hardware such as the hardware shown in network data processing system 100 in FIG. 1.

In this illustrative example, machine learning system 202 in noise environment 200 can operate to predict noise 204 for aircraft 206. In this illustrative example, the prediction of noise 204 is a prediction of sound exposure level 208 generated by aircraft 206. In this example, sound exposure level 208 referred to as SEL 210.

Sound exposure level 208 can be determined for event 209. In this illustrative example, event 209 begins when sound level 213 exceeds sound threshold 211 and ends when sound level 213 falls below sound threshold 211. These crossings of sound threshold 211 defines duration 219 for event 209. Sound levels 215 recorded during event 209 can be evaluated to determine sound exposure level 208 for event 209. The measurement of sound levels 215 can be correlated to consecutive time instances 231 for event 209. Consecutive time instances 231 means that the time instances occur one after another without a gap, interruption, or missing time instance.

Sound exposure level 208 represents the total sound energy that is produced during event 209 that begins when the sound level exceeds sound threshold 211 and ends when the sound level drops below sound threshold 211. Sound exposure level 208 is normalized to one second in this example.

In this illustrative example, aircraft 206 can take a number of different forms. For example, aircraft 206 can be a commercial airplane, a tilt-rotor aircraft, a tilt wing aircraft, a vertical takeoff and landing aircraft, an electrical vertical takeoff and landing vehicle, a personal air vehicle, and other types of aircraft 206.

In this illustrative example, machine learning system 136 comprises computer system 212 and controller 214. Controller 214 is located in computer system 212. In this illustrative example, controller 214 can operate to predict sound exposure level 208 generated by generated by aircraft 206 for flight path 216 over location 218. In this illustrative example, flight path 216 can be for an arrival or departure of aircraft 206. Location 218 is an airport in this example but can be any area where a prediction of sound exposure level 208 is of interest. As another example, location 218 can be an area adjacent to or near an airport.

Controller 214 can be implemented in software, hardware, firmware, or a combination thereof. When software is used, the operations performed by controller 214 can be implemented in program code configured to run on hardware, such as a processor unit. When firmware is used, the operations performed by controller 214 can be implemented in program code and data and stored in persistent memory to run on a processor unit. When hardware is employed, the hardware can include circuits that operate to perform the operations in controller 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 220 that are capable of executing program instructions 222 implementing processes in the illustrative examples. As used herein a processor unit in the number of processor units 220 is a hardware device and is comprised of hardware circuits such as those on an integrated circuit that respond and process instructions and program code that operate a computer. When a number of processor units 220 execute program instructions 222 for a process, the number of processor units 220 is one or more processor units that can be on the same computer or on different computers. In other words, the process can be distributed between processor units on the same or different computers in a computer system. Further, the number of processor units 220 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, controller 214 trains a set of machine learning models 224 to predict sound exposure level 208 generated by aircraft 206 for flight path 216 during flight 217 of aircraft 206 over location 218 using a training dataset 226. In this example, flight path 216 can be a future or planned flight path when flight 217 of aircraft 206 has not yet occurred.

In this illustrative example, training dataset 226 comprises historical aircraft sensor data 228 for selected parameters 230, historical atmospheric data 232, and historical sound data 234 recorded by a microphone system 236 for flight paths 238 over location 218. Historical aircraft sensor data 228 for selected parameters 230, historical atmospheric data 232, and historical sound data 234 recorded by a microphone system 236 for flight paths 238 can be for at least one of an aircraft model, a tail number, or an airline. In other words, training dataset 226 can have levels of granularity with respect to predictions of sound exposure level 208.

Historical aircraft sensor data 228 is sensor generated data from various aircraft flying flight paths 238 over location 218. The various aircraft that generate historical aircraft sensor data 228 can include at least one of aircraft 206 or other aircraft. Historical atmospheric data 232 can include temperature, humidity, pressure, wind, and other weather conditions. Historical atmospheric data 232 can include information for different altitudes.

In this illustrative example, historical sound data 234 comprises sound data recorded for flight paths 238. Historical sound data 234 can also include metadata about the sound recorded. For example, the metadata can include slant distances, microphone configuration, microphone locations, and other suitable information. Microphone system 236 comprises microphones at different positions in or near location 218. These microphones can record sound in location 218. For example, microphones can be located along a runway, a flight path, or other positions and location 218. As depicted, microphone system 236 records sound level 213.

In this illustrative example, all of the historical data in training dataset 226 is correlated to times for when flight paths 238 are already flown flight paths for one or more aircraft. Historical sound data 234 can be part of airport data 240. Further, airport data 240 can include other information for training dataset 226. For example, airport data 240 can include information about aircraft altitude, location, and other information that can be used to determine flight paths 238. As a result, flight paths 238 can be obtained from airport data 240 in addition to or in place of using historical aircraft sensor data 228. In this example, airport data 240 also includes values for sound exposure levels and the durations of the events from which the sound exposure levels were determined.

Controller 214 can predict sound exposure level 208 generated by aircraft 206 for flight 217 of aircraft 206 using flight path 216 over location 218 using the set of machine learning models 224 after training the set of machine learning models 224 using training dataset 226. Based on predicting sound exposure level 208, controller 214 can perform a set of actions 242.

The set of actions 242 can include at least one of planning flight path 216 over location 218 using the prediction of the sound exposure level 208 generated by aircraft 206 for flight path 216 over location 218, determining compliance with a regulation regarding sound exposure level 208 for the location, changing flight path 216, logging sound exposure level 208, change a flight time for using flight path 216, identifying changes to aircraft configuration for aircraft 206, automatically changing the flight path 216, or other suitable actions. These actions can be used to reduce noise 204 generated by aircraft 206 prior to aircraft 206 flying over location 218 using flight path 216. For example, changing the flight time for using flight path 216 to a time when atmospheric conditions are different such that the flight using flight path 216 at the change flight time will provide a desired level for sound exposure level 208.

Figure 3:
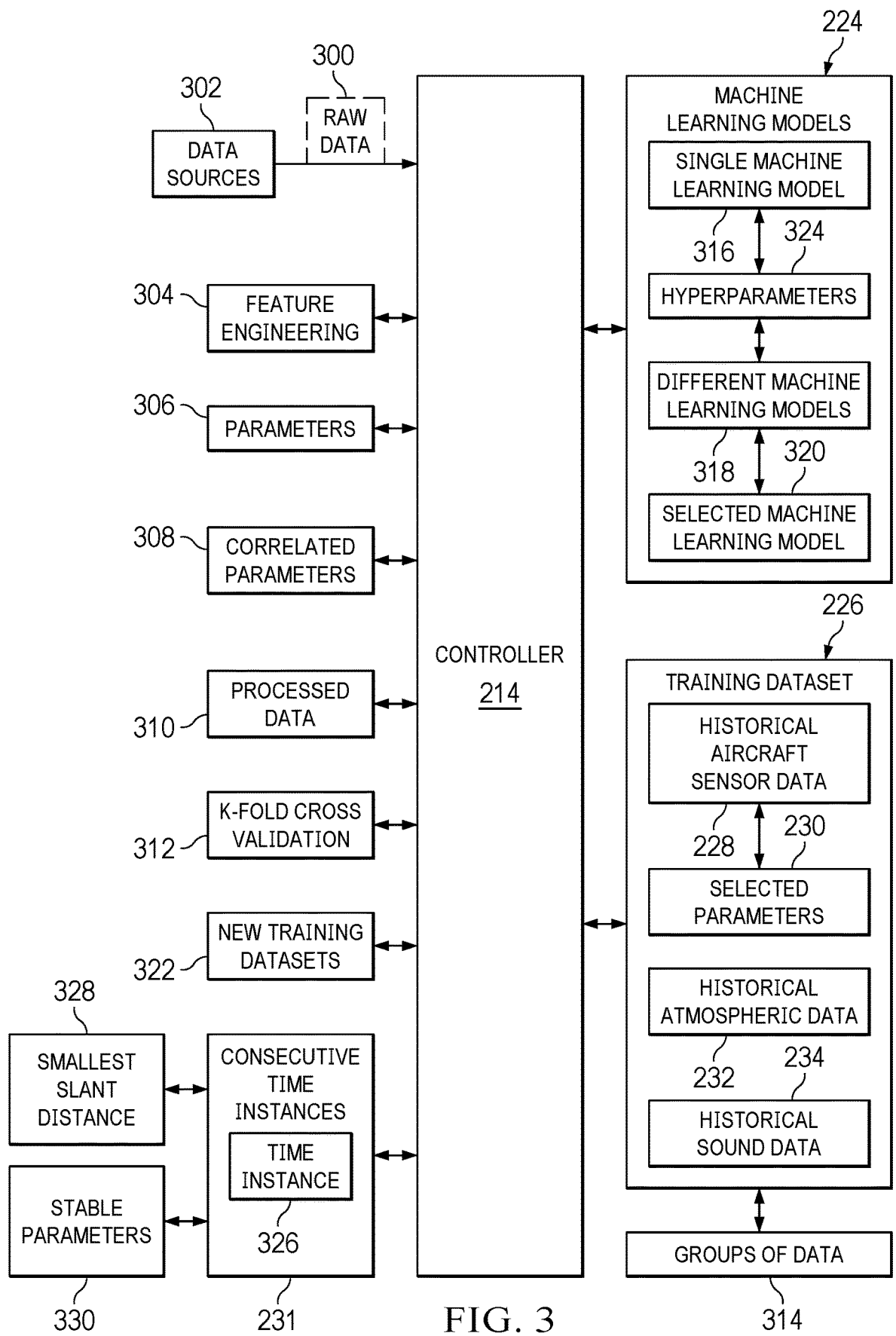
FIG. 3 is an illustration of a block diagram for training machine learning models in accordance with an illustrative embodiment.

Turning next to FIG. 3, an illustration of a block diagram for training machine learning models is depicted in accordance with an illustrative embodiment. In this illustrative example, controller 214 receives raw data 300 from data sources 302 for processing to create training dataset 226.

Raw data 300 can be large and volume, noisy, and incomplete. This raw data is historical data that can include continuous parameter logging (CPL) data, ERA5 weather data, airport data, and other suitable types of data. In this example, continuous parameter logging data is an example of historical aircraft sensor data 228 in FIG. 2.

In this example, ERA5 weather data is an example of historical atmospheric data 232. ERA5 weather data can include temperature, wind, humidity with timestamps. ERA5 is available from European Centre for Medium-Range Weather Forecasts (ECMWF), which is an independent intergovernmental organization.

Airport data in raw data 300 is an example of data that can include historical sound data 234. This historical sound data 234 is ground truth and can include sound exposure level 208 for microphone locations, the duration of the sound exposure level, slant distances, and aircraft altitudes.

Each microphone can potentially record sound exposure level 208 when the recorded sound levels recorded by that microphone exceed the sound threshold and then fall below the sound threshold. The sound exposure level can be received as part of historical sound data 234. Additionally, historical sound data 234 can also include the duration of the event 209 used to determine sound exposure level 208.

In processing raw data 300, controller 214 can perform feature engineering 304. In this illustrative example, feature engineering 304 can include at least one of selecting relevant features, handling missing data, computing additional parameters, normalizing data, standardizing data, performing dimensionality reduction, or other suitable processing of the raw data. For example, controller 214 can compute additional parameters, such as thrust for left and right engines, atmospheric absorption at 251 Hz, 398 Hz, and 631 Hz frequencies, day of week, and week of month, and impute values for missing parameters such as aircraft weight, fuel flow for left and right engines, runway code, and registration.

These different operations can be performed in feature engineering 304 to select salient features for use as selected parameters 230 for which data is included in training dataset 226. In performing feature engineering, controller 214 can select parameters from parameters 306 identified in raw data 300. The selection of these parameters are correlated parameters 308 that have a correlation to sound exposure level 208 to form correlated parameters 308.

Further, parameters 306 can be removed from correlated parameters 308 that are repetitive to form selected parameters 230. Repetitive parameters can be filtered out using techniques such as correlation selection and mutual information. A final selection of salient features to form selected parameters 230 can be made using a dimensionality reduction algorithm such as Principal Component Analysis (PCA).

In this illustrative example, raw data 300 processed using feature engineering 304 forms processed data 310. Processed data 310 can be stored in a data structure such as one or more tables.

With timeseries data in processed data 310, each time step is a row and each sensor reading for a parameter is a column in the table. For example, each row can be for a particular time step in which the columns are values for selected parameters 230.

Each table can be for a particular flight using the flight path for a particular microphone. For example, a table can be for departure or arrival using a flight path. In the illustrative example, a time step that best represents sound exposure level 208 can be selected for a particular microphone.

In generating processed data 310, controller 214 can select consecutive time instances 231 in which time instance 326 in consecutive time instances 231 has smallest slant distance 328 between an aircraft and a microphone in which all of selected parameters 230 for consecutive time instances 231 are stable parameters 330. The number of consecutive time instances 231 included are based on duration 219 of sound exposure level 208. In this example, duration 219 and the value of sound exposure level 208 can be received in historical sound data 234. In this example, selected parameters 230 are stable parameters 330 when a moving average of each selected parameter in selected parameters 230 is within a threshold.

In this illustrative example, selected parameters 230 are examined to identify stable parameters 330 and not all of the parameters from which selected parameters 230 were identified. Selected parameters 230 are correlated such that these parameters change over time as sound exposure level 208 changes. Other parameters not identified as selected parameters 230 are excluded. These other parameters do not change or change regardless of changes to sound exposure level 208. For example, parameters, such as date, time, or other similar parameters, are not selected parameters 230 and are not considered.

When smallest slant distance 328 is found for a microphone, the selected parameters 230 for that time instance is added to training dataset 226. Further, selected parameters for additional time instances including the time instance are added to form consecutive time instances 231.

The selection can be performed using heuristics searching for the best matching group of consecutive time instances 231 where the slant distance microphone to the aircraft is below the threshold and selected parameters 230 remain stable. In this illustrative example, the sound exposure level can be measured as a label for selected parameters 230 for consecutive time instances 231 within event 209. This selection of selected parameters 230 for consecutive time instances 231 can be repeated for each microphone in microphone system 236 for which historical sound data 234 is present.

In this example, processed data 310 can be split or divided for use in evaluating quality of the set of machine learning models 224. For example, k-fold cross validation 312 can be performed to divide up processed data for use. With k-fold cross validation 312 processed data 310 is split into k parts. k−1 part of the data is used for training and the remaining 1 part is used for validation and testing in a rotating manner.

In this illustrative example, training dataset 226 can be comprised of groups of data 314. Each group of data in the groups of data 314 is for a flight using a flight path in the flights using flight paths 238 and includes historical aircraft sensor data for selected parameters 230, historical atmospheric data, and historical sound data recorded by a microphone system corresponding to time instances for the sound exposure levels for the flight.

The set of machine learning models 224 can be single machine learning model 316. In another example, the set of machine learning models 224 can be different machine learning models 318. When different machine learning models 318 are present, these machine learning models can be selected from at least one of one of a linear machine learning model, a nonlinear machine learning model, an ensemble machine learning model system, a neural network model, or other suitable type of machine learning model.

In this illustrative example, the training is performed for each machine learning model in different machine learning models 318. Each machine learning model is trained using the same training dataset, training dataset 226. With this type of training, different machine learning models 318 can compete with each other to find the best machine learning model.

Further, before, during or after training, hyperparameters 324 can be adjusted for different machine learning models 318 to increase accuracy prior to selecting the machine learning model from the different machine learning models 318 having the highest level of accuracy. Hyperparameters 324 are parameters whose values are used to control the learning process in machine learning. Hyperparameters 324 can also be adjusted in single machine learning model 316 to increase the performance this machine learning model.

In other words, controller 214 can identify a machine learning model from different machine learning models 318 having a highest level of accuracy in predicting the sound exposure levels. A machine learning model having the highest level of accuracy is selected machine learning model 320 and used to predict sound exposure level 208 for flight path 216 of aircraft 206 over location 218.

The selection of selected machine learning model 320 can be made in any number of different ways. For example, the resulting mean error and standard deviation can be determined for each of different machine learning models 318 to select the top-ranking model as selected machine learning model 320.

In the illustrative example, this training can be repeated periodically. In some cases, the training can be performed continuously as new raw data is received from data sources 302. For example, new training datasets 322 can be generated from new aircraft sensor data for selected parameters 230, new atmospheric data, and new sound data recorded by the microphone system 236 in raw data 300.

With new training datasets 322, training of different machine learning models 318 can be repeated. Further, identifying the machine learning model having the highest level of accuracy in predicting the sound exposure levels can be performed in response to continuing to train different machine learning models 318. As a result, selected machine learning model 320 can change over time as different machine learning models 318 are continued to be trained using new training datasets 322.

Figure 4:
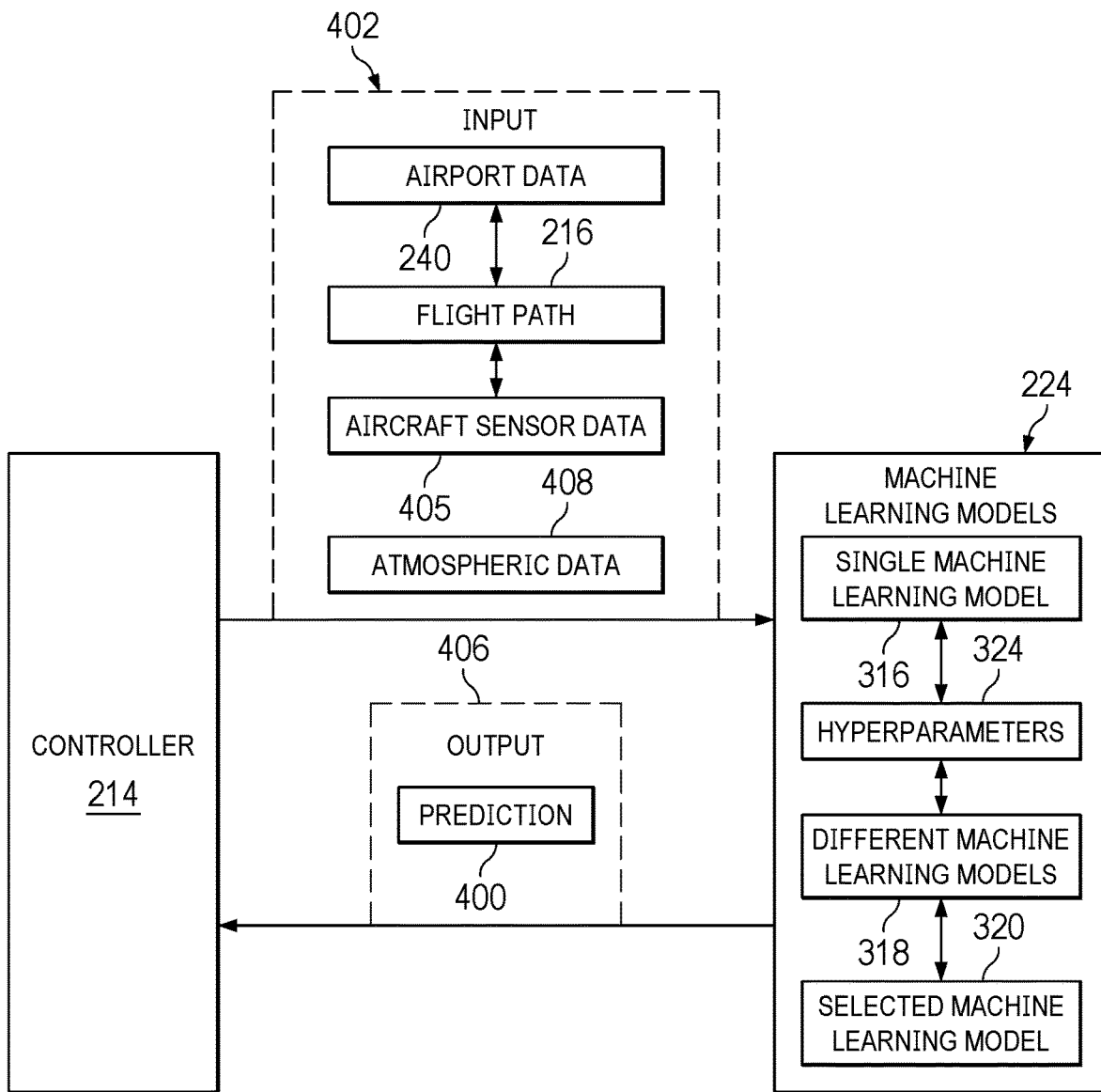
FIG. 4 is an illustration of a block diagram for predicting a sound exposure level for a flight path of an aircraft in accordance with an illustrative embodiment.

With reference next to FIG. 4, an illustration of a block diagram for predicting a sound exposure level for a flight path of an aircraft is depicted in accordance with an illustrative embodiment. In this illustrative example, controller 214 can use the set of machine learning models to generate prediction 400 of sound exposure level 208 for flight path 216 of aircraft 206 over location 218.

In this illustrative example, controller 214 sends input 402 into the set of machine learning models 224 and in particular to selected machine learning model 320. In response, the set of machine learning models 224 generates output 406 containing prediction 400.

Input 402 is expected to be the same type of data in training dataset 226 without labels such as sound exposure levels. In this illustrative example, input 402 comprises aircraft sensor data 405 for selected parameters 230, atmospheric data 408, and flight path 216. Flight path 216 is expected path that aircraft 206 will use. Flight path 216 can be derived from airport data 240 or can be input as expected waypoints in aircraft sensor data 405.

In other words, some forecasting or assumptions can be made for data in input 402 to predict sound exposure level 208 for flight 217 of aircraft 206 using flight path 216 prior to aircraft 206 flying over location 218 using flight path 216. In this illustrative example, atmospheric data 408 can be obtained from weather forecasts. Aircraft sensor data 405 can be obtained from an analysis of prior flights using flight path 216 for aircraft 206 or other aircraft of the same or similar type. Data from prior flights for flight path 216 can be used when that data is not expected to change or change in a manner that reduces prediction 400 to an undesired level of accuracy.

For example, some of selected parameters 230 are stable and may not change from flight to flight for flight path 216. For example, fuel consumption may be stable and aircraft weight and fuel weight may not change sufficiently to reduce the accuracy in predicting sound exposure level 208 with a desired level of accuracy.

Thus, although some deviations may be present in actual flight as compared input 402, the deviations can be small enough that prediction of sound exposure level 208 has a desired level of accuracy. This accuracy even with some deviations from data that is generated during actual flight is greater than current techniques for predicting sound exposure levels.

In some illustrative examples, the prediction can be performed in real time. In this illustrative example, real time means the actual time during which an event occurs. For example, performing the prediction in real time can mean that inputs to the machine learning models are made quickly enough during the flight of aircraft on a flight path such that a prediction of the sound exposure pressure level can be received immediately as feedback. In other words, the prediction can be received quickly enough such that actions can be taken or adjustments can be made to the flight of the aircraft using a particular flight path.

In other words, at least one of aircraft sensor data 405 or atmospheric data 408 can be obtained for input 402 in real time. In this manner, predictions can be made for sound exposure level 208 for each microphone and microphone system 236. From these predictions of sound exposure level 208 for flight path 216.

In one illustrative example, one or more technical solutions are present that overcome a problem with predicting sound exposure levels for aircraft flying over a location such as an airport with the desired level of accuracy. As a result, one or more solutions can provide a solution that employs machine learning models to predict aircraft noise more accurately as compared to current techniques. For example, machine learning system 202 can provide sound exposure level 208 with a mean error of less than 2 dB(A) with a 0.2 dB(A) of standard deviation for both arrival and departures flights. This level of accuracy shows a higher level of improvement as compared to current aircraft noise prediction program (ANOPP2), which is an improved version of ANOPP that has a mean error of less than 4 dB(A) for departures for computing a sound exposure level but has issues in computing this value for arrivals. The units dB(A) means the decibels measured are an expression of loudness of sounds in air as perceived by the human ear.

Computer system 212 can be configured to perform at least one of the steps, operations, or actions described in the different illustrative examples using software, hardware, firmware, or a combination thereof. As a result, computer system 212 operates as a special purpose computer system in which controller 214 in computer system 212 enables predictions of sound exposure levels for flights of aircraft using different flight paths. In particular, controller 214 transforms computer system 212 into a special purpose computer system as compared to currently available general computer systems that do not have controller 214.

The illustration of noise environment 200 and the different components in figures in FIGS. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, controller 214 trains additional machine learning models to provide predictions of sound exposure level 208 for other aircraft in addition to or in place of aircraft 206. Further, computer system 212 can include components in aircraft 206 such that controller 214 can operate within aircraft 206 to predict sound exposure level 208 in real time. With this location of components in aircraft 206, controller 214 can more easily obtain sensor data from aircraft 206 in real time and make a real time prediction of sound exposure level 208 for aircraft 206.

Further, controller 214 may be located on a single computer or distributed in multiple computers in in computer system 212. Additionally, the functionality of controller 214 can be implemented as a service in a cloud computing environment. This service can be offered as a subscription a per use basis for aviation authorities, regulatory agencies, air navigation service providers, airlines, and other entities. Additionally, the predictions generated can also be used to develop aircraft designs that produce less noise. Further, these predictions can also be used to reconfigure, upgrade, or retrofit current aircraft to reduce noise produced by the aircraft.

Figure 5:
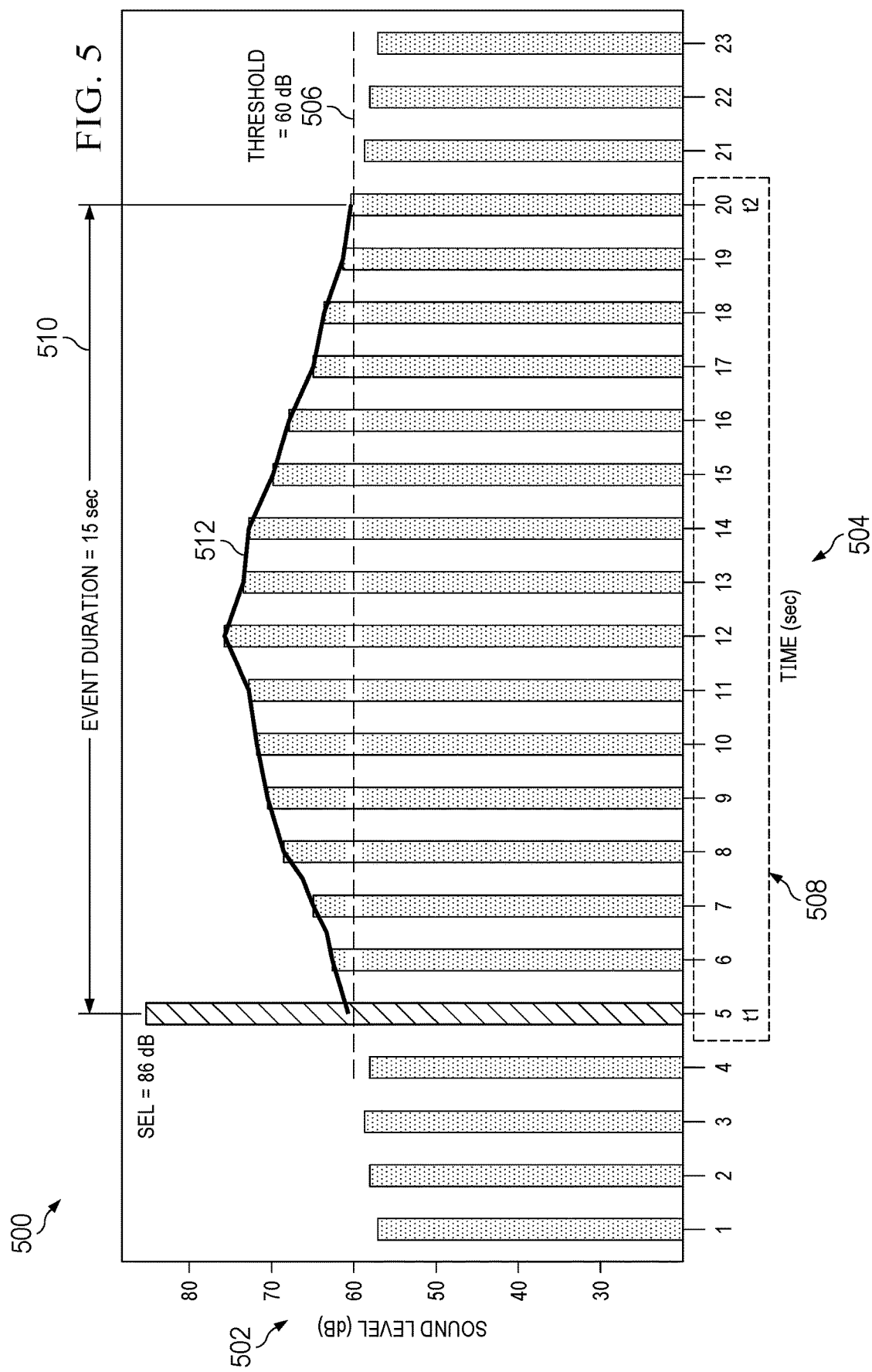
FIG. 5 is an illustration of a graph of a noise event in accordance with an illustrative embodiment.

Turning now to FIG. 5, an illustration of a graph of a noise event is depicted in accordance with an illustrative embodiment. In this illustrative example, graph 500 is a graph of a noise event recorded by a microphone and a microphone system at an airport. As depicted, y-axis 502 is the sound level in dB and x-axis 504 is time in seconds.

As depicted, the sound exposure level is measured from when the level sound exceeds threshold 506 until the sound level falls below threshold 506. In this example, threshold 506 is 60 dB.

As illustrated, consecutive time instances 508 are present for this event for sound exposure level. The event with the consecutive time instances can be from 5 seconds to 20 seconds. The event for the sound exposure level has duration 510 of 15 seconds. In other words, the sound exposure level can be determined from curve 512 formed by the sound measurements for the consecutive time instances 508. Thus, the sound exposure level can be determined by taking into account the area under curve 512, which extends from time t1=5 seconds to time t2=20 seconds.

Although a physics-based approach can compute this area using a definite integral, the illustrative examples can use a search algorithm to identify the best matching number of time steps such as consecutive time instances 508. These time steps for consecutive time instances 508 are used to identify duration 510. The values for the selected parameters corresponding to consecutive time instances 508 can be selected for use in training machine learning models.

In this depicted example, sound exposure level is normalized to one second. As depicted, the sound exposure level is 86 dB. This value for the sound exposure level is greater than another type of sound measurement, maximum sound pressure level (LAmax), which is 76 dB in this example. The sound exposure level is normalized to one second which results in this type of measurement being greater than the maximum sound pressure level for the same noise measurements.

In this example, logarithmic addition is applied for determining the sound exposure level. The same can be applied for the A-weighted noise as well. This type of noise is often measured by noise monitors in airports.

Figure 6:
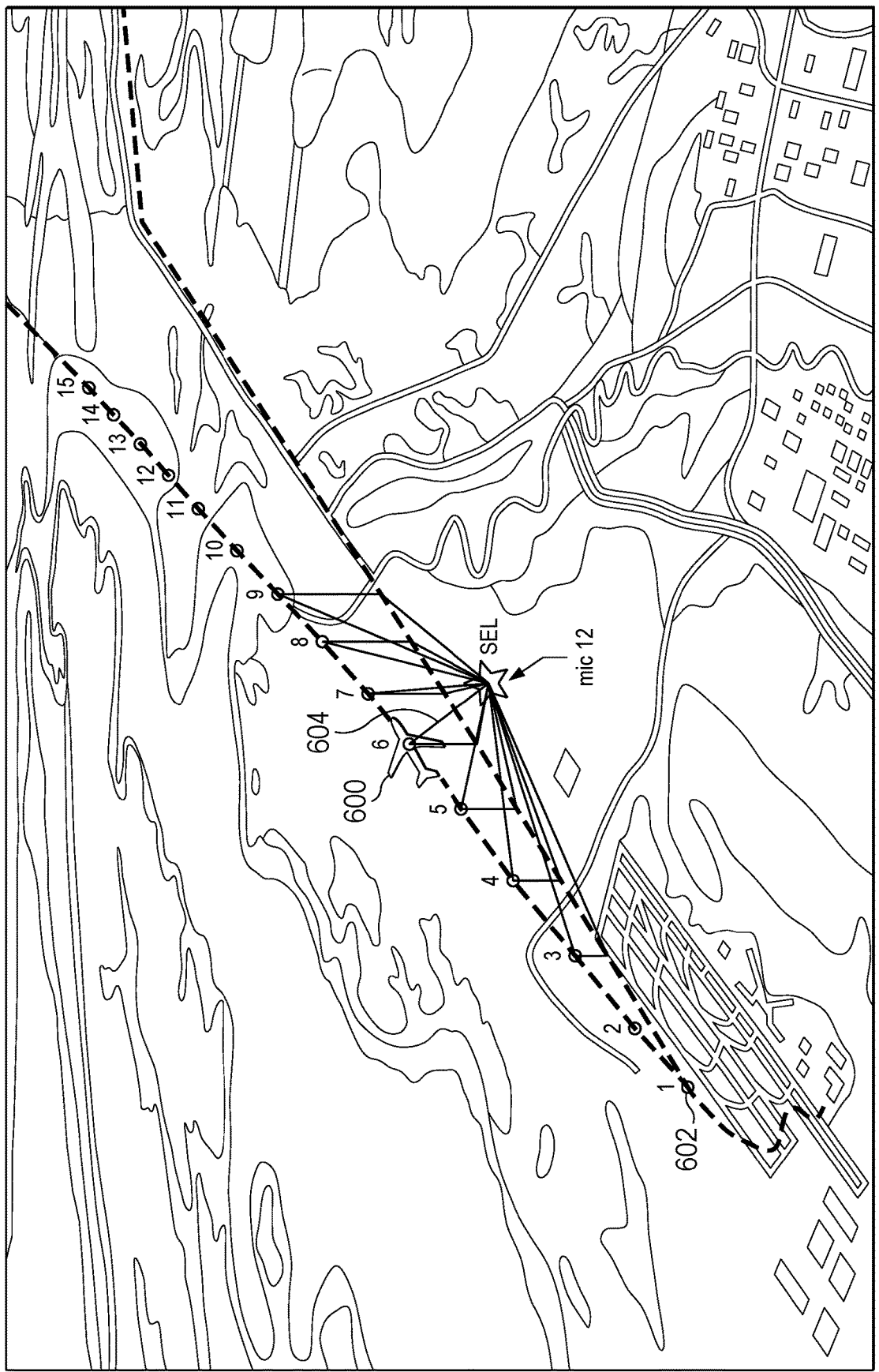
FIG. 6 is an illustration of a flight path for departures of an aircraft in accordance with an illustrative embodiment.

Turning next to FIG. 6, an illustration of a flight path for departures of an aircraft is depicted in accordance with an illustrative embodiment. In this illustrative example, aircraft 600 flies on a flight path identified by waypoints 602. In this depicted example, waypoints 602 comprises waypoints 1-15. In this illustrative example, the time for aircraft 600 to travel from one waypoint to another waypoint is one second. As result, a one second step is present between waypoints and each waypoint can represent a time instance.

As depicted, aircraft 600 is located waypoint 6 in waypoints 602. In this example, at waypoint 6, aircraft 600, microphone 12 has minimum slant distance 604 to aircraft 600. In this example, microphone 12 records sound levels that are greater than and less than the threshold for a sound exposure event. In this example, the event for the sound exposure level has duration of seven seconds.

The illustrative examples identify the best matching time instances to correlate sensor data and atmospheric data with the measurement of the sound exposure level. The best matching time instances are consecutive time instances in this example.

The recording of the sound levels by microphone 12 that exceed the threshold is for aircraft 600 traveling from waypoint 3 to waypoint 9. In this example, the sound exposure level has a duration of seven seconds and the consecutive time instances are the time instances from waypoint 3 to waypoint 9.

In this example, sensor data from sensor readings for aircraft 600 at this way point can be correlated with other parameters to create training data in which the sound exposure level is correlated with selected features. In other words, the sound exposure level measure can be used as a label for sensor data, atmospheric data, and airport data at the consecutive time instances at which microphone 12 records sound for aircraft 600 from waypoint 3 to waypoint 9 for the sound exposure level.

In this example, a single microphone is depicted along the flight path defined by waypoints 602. In other illustrative examples, additional microphones can be present in which each microphone can make noise event measurements for the sound exposure level. In other words, each microphone can potentially measure sound levels that rise above the sound threshold and then drop below the sound threshold for an event for which a sound exposure level can be determined. In this instance, different microphones can have different values for sound exposure levels measured by those microphones along a flight path during a flight of aircraft 600.

Figure 7:
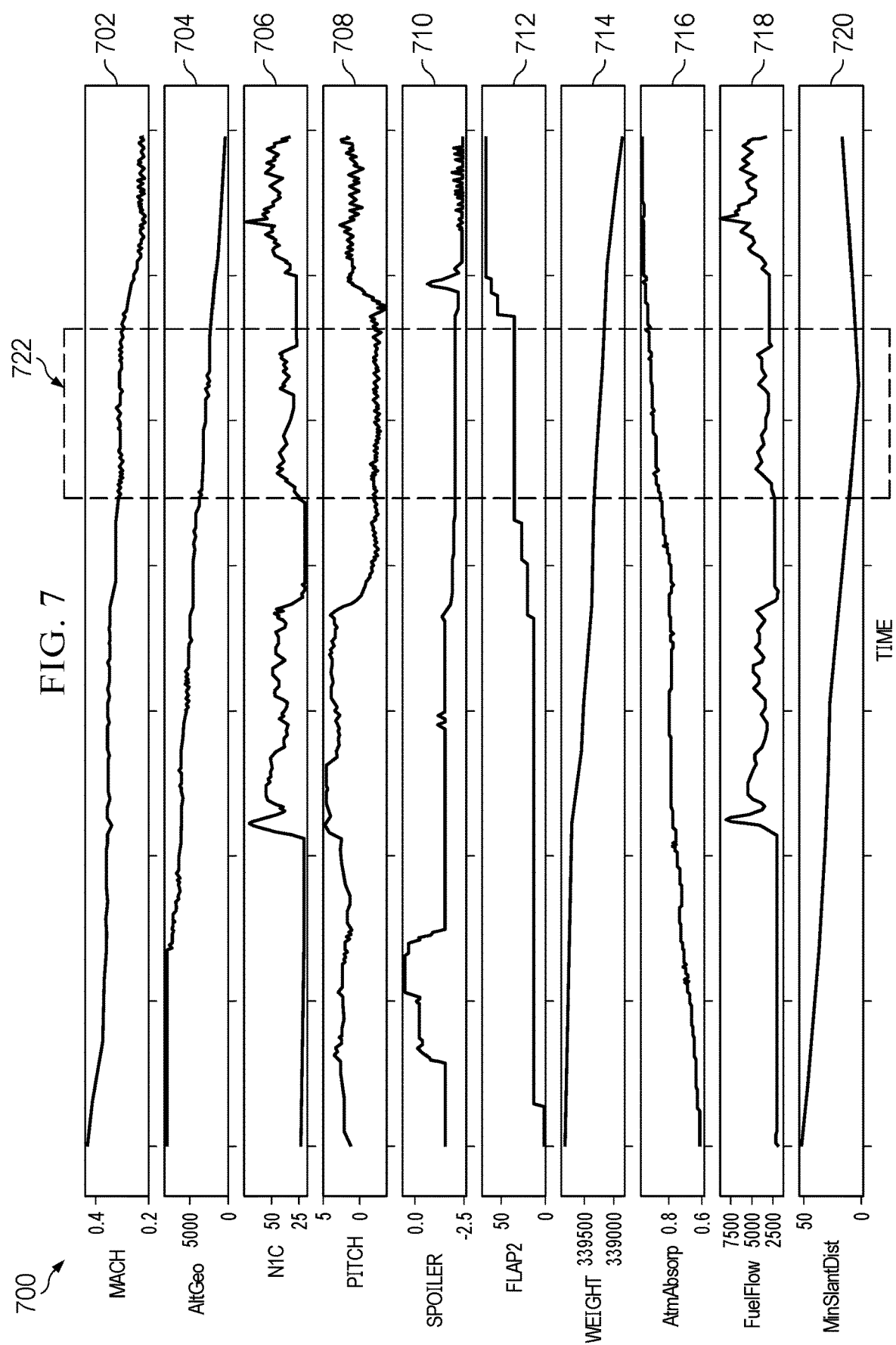
FIG. 7 is an illustration of graphs of sensor data for selected parameters in accordance with an illustrative embodiment.

With reference now to FIG. 7, an illustration of graphs of sensor data for selected parameters are depicted in accordance with an illustrative embodiment. In this illustrative example, graphs 700 are graphs for parameters such as Mach 702, altitude (AltGeo) 704, N1C 706, pitch 708, spoiler 710, flap2 712, weight 714, atmospheric absorption (AtmAbsorp)

716, fuel flow (FuelFlow) 718, and minimum slant distance (MinSlantDist) 720. The y-axes for these graphs indicate values for the associated parameters. For example, atmospheric absorption (AtmAbsorp) 716 can be absorption units (Au). As another example, minimum slant distance (MinSlantDist) 720 can be in feet. The x-axes of graphs 700 are in time.

With the sound exposure level (SEL) being potentially recorded by each microphone for the entire arrival or departure, the process can identify which window of consecutive time instances in graphs 700 should be correlated to the ground truth for sound exposure level (SEL) to train machine learning models. In identifying the consecutive time instances, the process determines which window of consecutive time instances should be selected. In this illustrative example, the window of consecutive time instances are consecutive time instances in which gaps are not present. In other words, data is present for each successive time instance in the sequence of time instances.

Heuristics searching can be performed to identify the best matching window of consecutive time instances. In this example, window of consecutive time instances is without gaps. In other words, a sound measurement is present for each time instance in the sequence for a gap to be absent. If sound data is missing, then the sequence of time instances is not used.

In the illustrative example, the best matching consecutive time instances in which the noise level measured by the microphone above a sound threshold are consecutive time instances in which selected parameters remain relatively stable with no radical changes for the selected parameters correlating to the consecutive time instances.

In this example, parameters that are relatively stable can be referred to as stable parameters. Stable parameters can be present when a moving average of the selected parameter in graph 700 are within a threshold.

If stable parameters are not present for the consecutive time instances in the window, the window can be moved to encompass another group of consecutive time instances for analysis.

In this illustrative example, window 722 is used as part of a search to identify a best matching consecutive time instances for the selected parameters in graphs 700. In other words, window 722 can be used to group consecutive time instances for evaluation. In this illustrative example, the width of window 722 is determined based on the duration of the event for which the sound exposure level. This duration can be received in airport data.

These different parameters are examples of parameters in other illustrative examples, the selection of the particular time instance can involve analyzing other numbers of parameters. For example, graphs 700 can include 50 selected parameters, 200 selected parameters, 750 selected parameters, or other number of selected parameters in other illustrative examples.

In this example, a heuristic search algorithm using Auto Regressive Integrated Moving Average (ARIMA)—like sliding window approach can be used. With this example the average value for each parameter is compared with the value of that parameter at each time instance in the consecutive time instances in the window to determine whether parameters are stable. With this process, the search can begin from the time instance where the slant distance between the microphone and aircraft is a minimum and that search expands on both sides of this time instance where the slant distance between the microphone and aircraft is a minimum. The search ends as soon as the slant distance is the minimum or in the neighborhood of the minimum where all the selected parameters are stable. For example, the selected parameters can be considered to be stable when the values of the selected parameters do not exceed the moving average.

Figure 8:
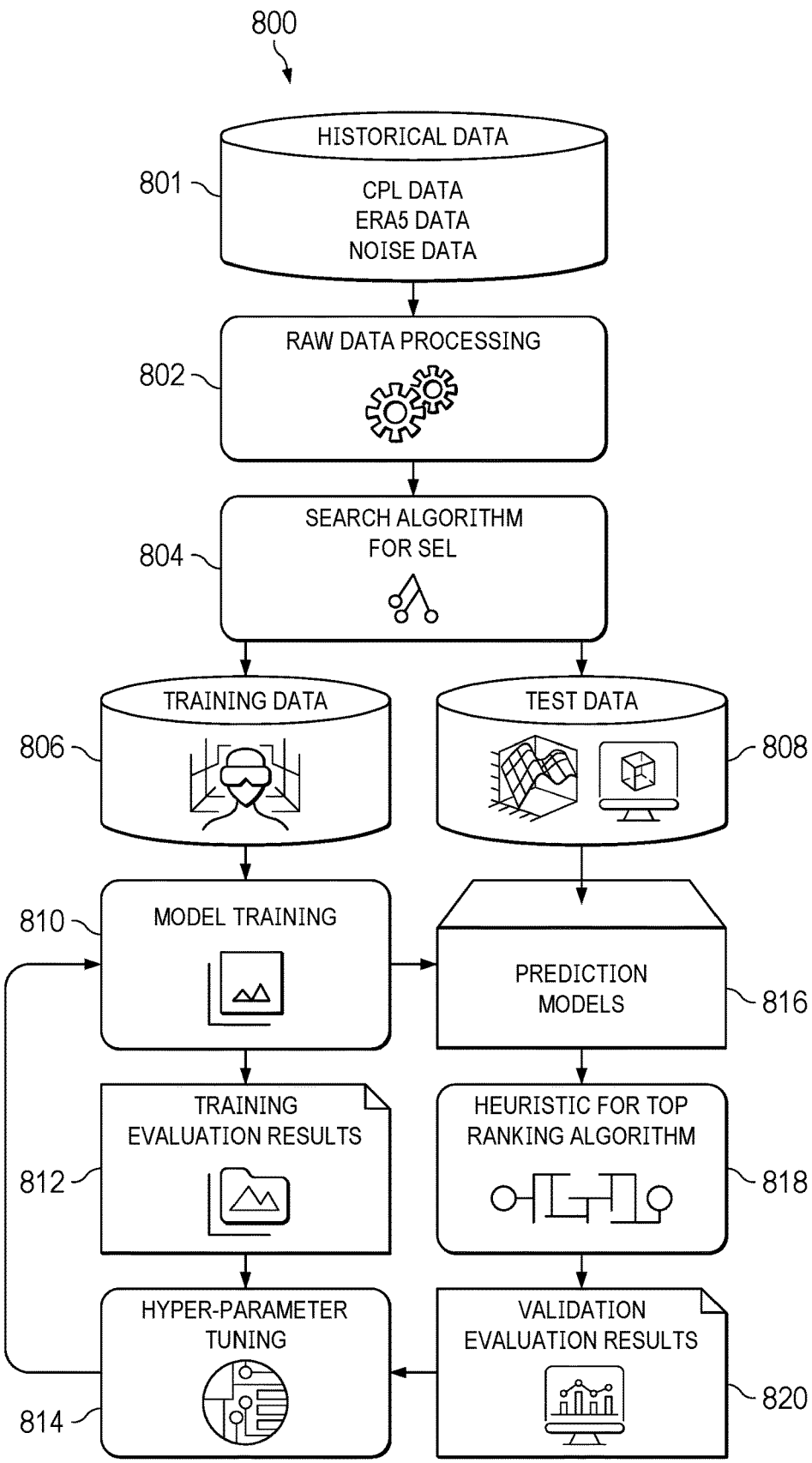
FIG. 8 is an illustration of a machine learning pipeline in accordance with an illustrative embodiment.

Turning next to FIG. 8, an illustration of a machine learning pipeline is depicted in accordance with an illustrative embodiment. In this illustrative example, machine learning pipeline 800 is an example the part you train machine learning models to predict sound exposure levels.

As depicted, historical data 801 can include sensor data in the form of continuous parameter (CPL) data, ERA5 weather data, and airport data including noise data generated from microphones measuring sound. In this example, sound measurements of sound exposure levels are removed as historical data 801 and used as labels in the training data. In other words, airport data and historical data 801 can include the value for the sound exposure level and the duration of the event used to determine the sound exposure level.

Machine learning pipeline 800 performs raw data processing 802. With raw data processing 802, raw data in historical data 801 can be processed for use by search algorithm for SEL 804. Raw data processing 802 can place raw data in historical data 801 into a form that can be used for training machine learning models. This processing can include, for example, imputing values for missing parameters, computing additional parameters not found in historical data 801, selecting parameters that have an impact on sound pressure level, removing repetitive parameters, and performing dimensionality reduction to obtain a desired number of selected parameters for use in training.

This data can be placed into data structures such as tables. Each row in the table represents a time instance and each column represents a selected parameter. In this example, multiple time instances in the table are used. The time instances are consecutive time instances, and the number of them are based on the duration of the event. For example, with an event duration of 8 second for the sound exposure event, 8 rows of data in the table are used in which each row is a consecutive time instance. With this example, each column is a sensor reading for that time instance for the particular flight where the event it recorded by a particular microphone.

In machine learning pipeline 800, search algorithm for SEL 804 identifies time instances where the sound exposure level (SEL) is present. This identification can be performed for each microphone and each flight to create datasets for training data 806 and test data 808. Training data 806 is used in model training 810 to train multiple machine learning models. These machines learning models are different types of machine learning using the same training dataset and training data 806. In other words, the machine learning models are all trained using the same training data.

Training evaluation results 812 can be analyzed and used to perform hyperparameter tuning 814. With hyperparameter tuning 814 additional model training can be performed until training evaluation results 812 provide some desired level of performance.

Model training 810 results in prediction models 816 which are machine learning models that have been trained to predict sound pressure levels. Prediction models 816 can be tested using test data 808.

With these predictions, heuristic for top ranking algorithm 818 can be used to select the top-ranking algorithm (prediction model) in prediction models 816. Heuristic for top ranking algorithm 818 can result in validation evaluation results 820 used to select the top-ranking prediction model.

For example, validation evaluation results 820 can include mean error and standard deviation for each prediction model in prediction models 816 from generating predictions using test data 808. In this example, mean error and standard deviation in validation evaluation results 820 are test results.

Further, hyperparameter tuning 814 can also be performed based on validation evaluation results 820. Hyperparameters can be adjusted by hyperparameter tuning 814 based on validation evaluation results 820. The final training model after validation can be used for testing and prediction of sound exposure levels.

Figure 9:
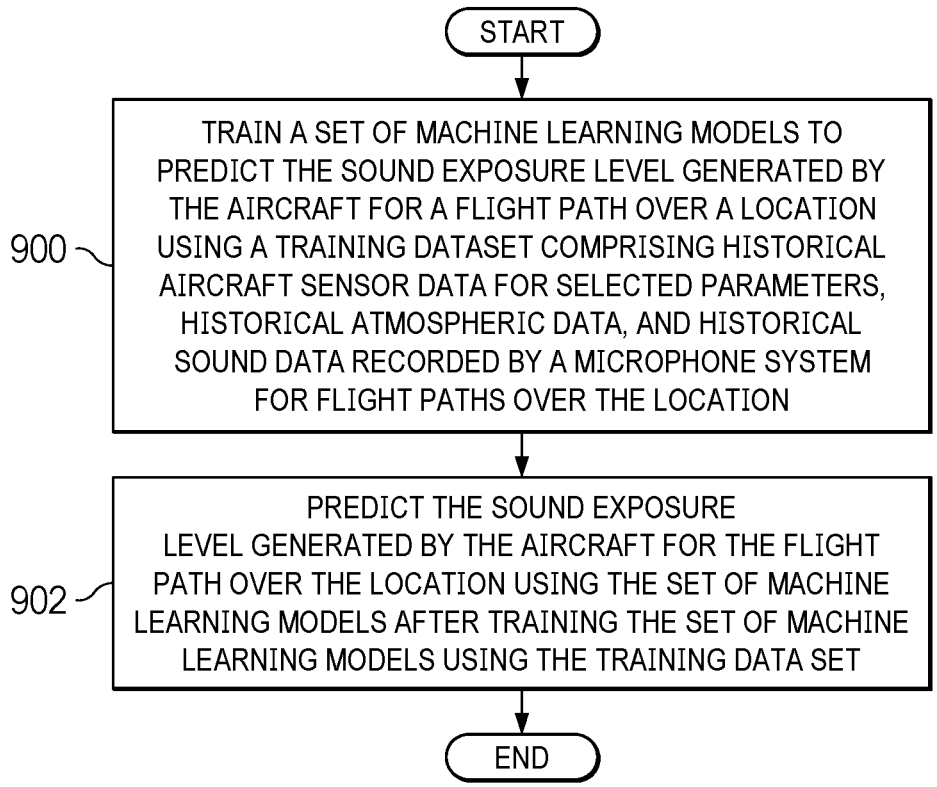
FIG. 9 is an illustration of a flowchart of a process for training a set of machine learning models to predict a sound exposure level in accordance with an illustrative embodiment.

With reference to FIG. 9, an illustration of a flowchart of a process for training a set of machine learning models to predict a sound exposure level is depicted in accordance with an illustrative embodiment. The process illustrated in FIG. 9 can be implemented using computer system 212 and controller 214 in FIG. 2. For example, the process can be implemented in controller 214 in computer system 212 in FIG. 2.

As depicted, the process begins by training a set of machine learning models to predict the sound exposure level generated by the aircraft for a flight path over a location using a training dataset comprising historical aircraft sensor data for selected parameters, historical atmospheric data, and historical sound data recorded by a microphone system for flight paths over the location (operation 900). In operation 900, the historical sound data can comprise events for sound exposure levels.

In the illustrative example, these events begin when the sound levels exceed a sound threshold and end when the sound level no longer exceeds the sound threshold. This sound threshold is a sound level selected for determining the duration of an event for which a sound exposure level is determined. For example, a sound exposure level event can have a duration starting at a sound level exceeding a sound threshold and ending at a sound level dropping below the sound threshold.

This historical sound data can include other types of data too. For example, the historical sound data can include meta data such as time stamps identifying time intervals when sound data was collected, microphone identifiers, and a duration of the sound exposure level within the noise event in the historical sound data.

The process predicts the sound exposure level generated by the aircraft for the flight path over the location using the set of machine learning models after training the set of machine learning models using the training dataset (operation 902). The process terminates thereafter.

Figure 10:
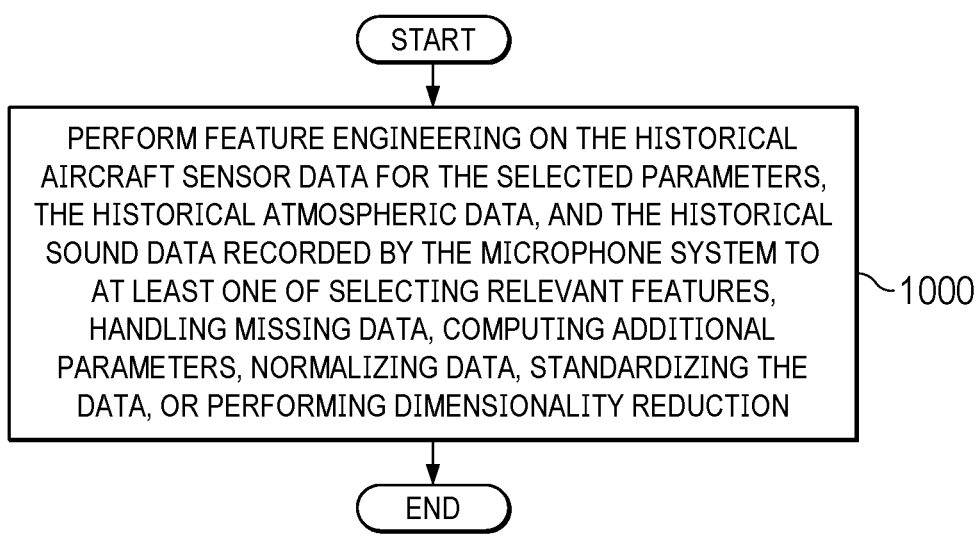
FIG. 10 is an illustration of a flowchart of a process for performing feature engineering on historical sensor data in accordance with an illustrative embodiment.

With reference now to FIG. 10, an illustration of a flowchart of a process for performing feature engineering on historical sensor data is depicted in accordance with an illustrative embodiment. The operations in this figure are examples of additional operations that can be used within the operations in the process in FIG. 9.

The process performs feature engineering on the historical aircraft sensor data for the selected parameters, the historical atmospheric data, and the historical sound data recorded by the microphone system to at least one of selecting relevant features, handling missing data, computing additional parameters, normalizing data, standardizing the data, or performing dimensionality reduction (operation 1000). The process terminates thereafter.

Figure 11:
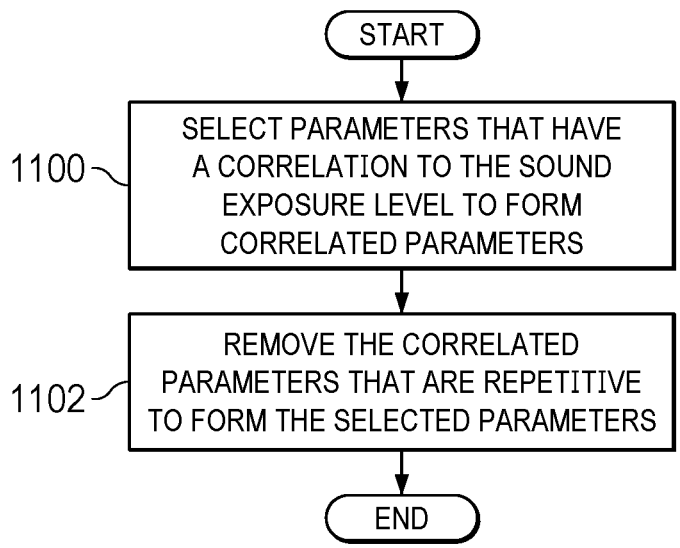
FIG. 11 is an illustration a flowchart of a process for selecting parameters to form correlated parameters in accordance with an illustrative embodiment.

With reference now to FIG. 11, an illustration a flowchart of a process for selecting parameters to form correlated parameters is depicted in accordance with an illustrative embodiment. The operations in this figure are examples of additional operations that can be used within the operations in the process in FIG. 9.

The process selects parameters that have a correlation to the sound exposure level to form correlated parameters (operation 1100). The process removes the correlated parameters that are repetitive to form the selected parameters (operation 1102). The process terminates thereafter.

Figure 12:
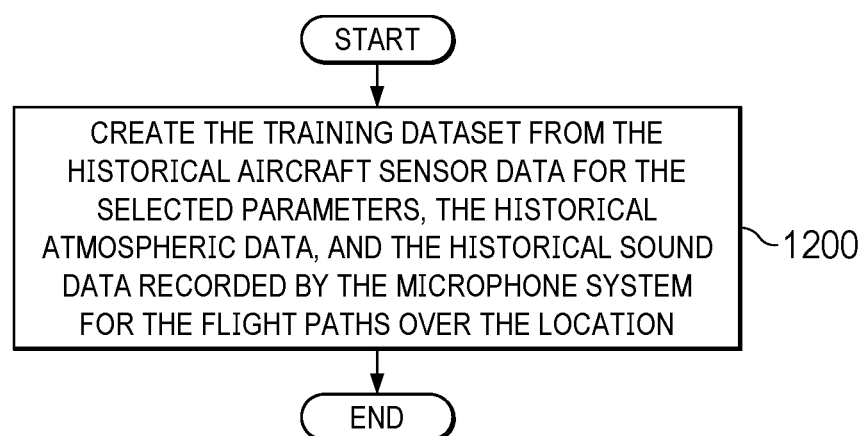
FIG. 12 is an illustration a flowchart of a process for creating a training dataset from sensor data in accordance with an illustrative embodiment.

With reference now to FIG. 12, an illustration a flowchart of a process for creating a training dataset from sensor data is depicted in accordance with an illustrative embodiment. The operations in this figure are examples of additional operations that can be used within the operations in the process in FIG. 9.

The process creates the training dataset from the historical aircraft sensor data for the selected parameters, the historical atmospheric data, and the historical sound data recorded by the microphone system for the flight paths over the location (operation 1200). In operation 1200, the historical sound data comprises sounds events for sound exposure levels. The process terminates thereafter.

In the example in FIG. 12, the training dataset created in operation 1200 comprises groups of data. Each group of data in the groups of data is for a flight in the flights and includes the sound exposure levels detected by microphones in the microphone system and the selected parameters corresponding to the time instances for the sound historical sound data levels for the flight. The sound exposure pressure levels can be used as labels for the selected parameters and the historical atmospheric data.

Figure 13:
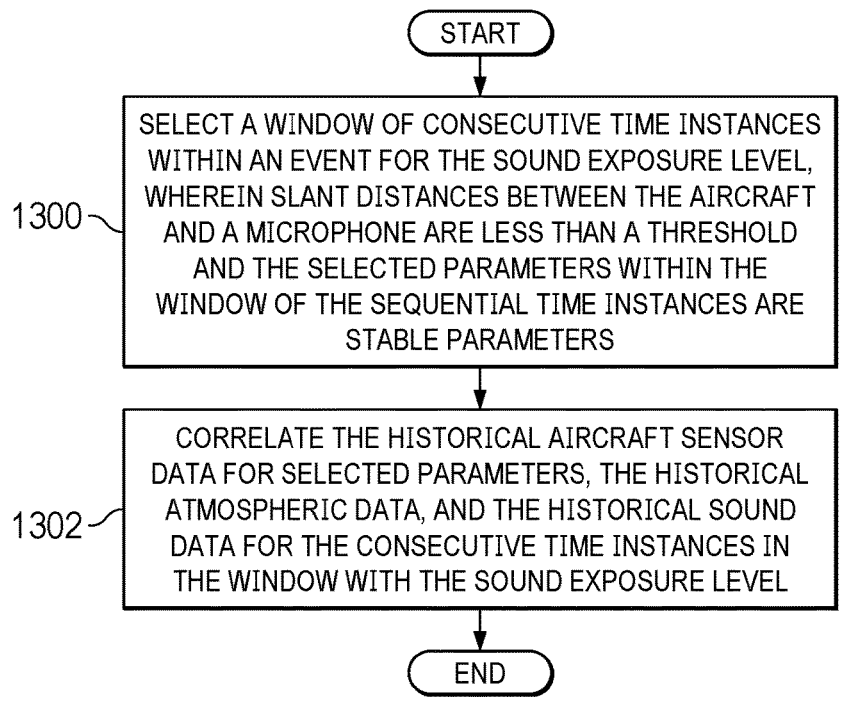
FIG. 13 is an illustration a flowchart of a process for selecting a window of consecutive time instance in accordance with an illustrative embodiment.

With reference now to FIG. 13, an illustration a flowchart of a process for selecting a window of consecutive time instances is depicted in accordance with an illustrative embodiment. The process in FIG. 13 is an example of one implementation for operation 1200 in FIG. 12.

The process selects a window of consecutive time instances within an event for the sound exposure level, wherein slant distances between the aircraft and a microphone are less than a threshold and the selected parameters within the window of the consecutive time instances are stable parameters (operation 1300). The process correlates the historical aircraft sensor data for selected parameters, the historical atmospheric data, and the historical sound data for the consecutive time instances in the window with the sound exposure level (operation 1302). The process terminates thereafter.

Figure 14:
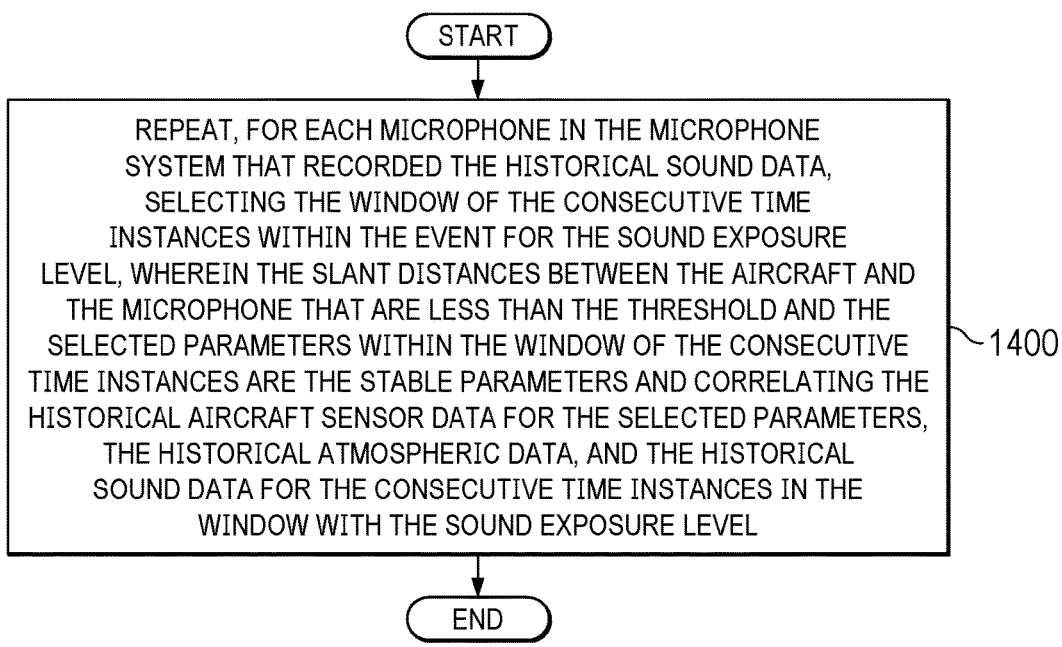
FIG. 14 is an illustration a flowchart of a process for repeating the selecting of the window of consecutive time instances in accordance with an illustrative embodiment.

With reference now to FIG. 14, an illustration a flowchart of a process for repeating the selecting of the window of consecutive time instances is depicted in accordance with an illustrative embodiment. The operations in this figure are examples of additional operations that can be used within the operations in the process in FIG. 13.

The process repeats, for each microphone in the microphone system that recorded the historical sound data, selecting the window of the consecutive time instances within the event for the sound exposure level, wherein the slant distances between the aircraft and the microphone are less than the threshold and the selected parameters within the window of the consecutive time instances are the stable parameters and correlating the historical aircraft sensor data for the selected parameters, the historical atmospheric data, and the historical sound data for the consecutive time instances in the window with the sound exposure level (operation 1400). The process terminates thereafter.

Figure 15:
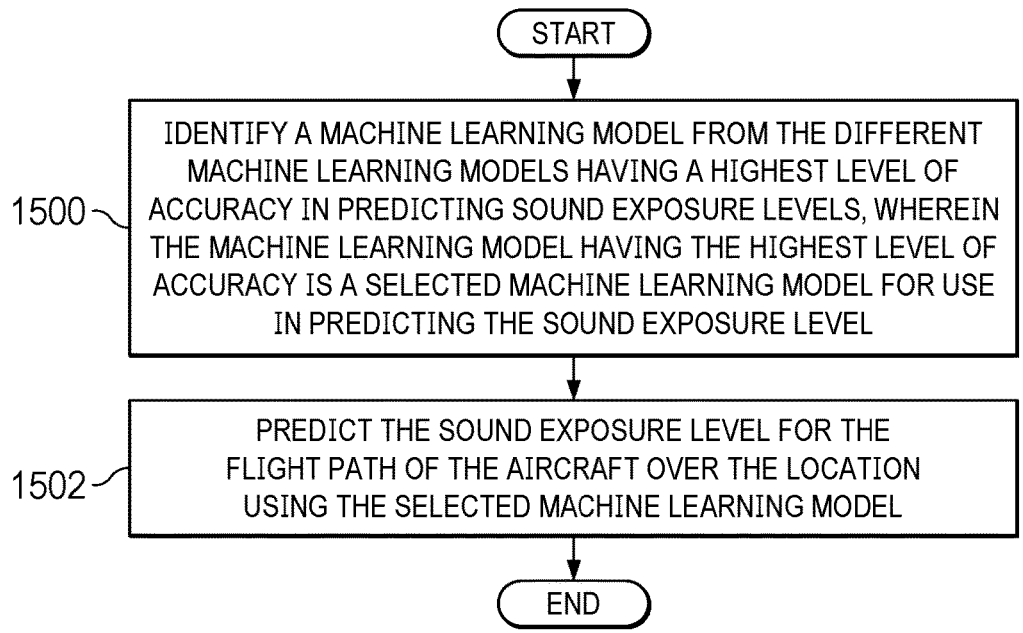
FIG. 15 is an illustration of a flowchart of a process for identifying a machine learning model in accordance with an illustrative embodiment.

With reference now to FIG. 15, an illustration of a flowchart of a process for identifying a machine learning model is depicted in accordance with an illustrative embodiment. The operations in this figure are examples of additional operations that can be used within the operations in the process in FIG. 9 and are an example of one implementation of operation 902 in FIG. 9.

The process identifies a machine learning model from the different machine learning models having a highest level of accuracy in predicting sound exposure levels, wherein a machine learning model having the highest level of accuracy is a selected machine learning model for use in predicting the sound exposure level (operation 1500). The process predicts the sound exposure level for the flight path of the aircraft over the location using the selected machine learning model (operation 1502). The process terminates thereafter.

Figure 16:
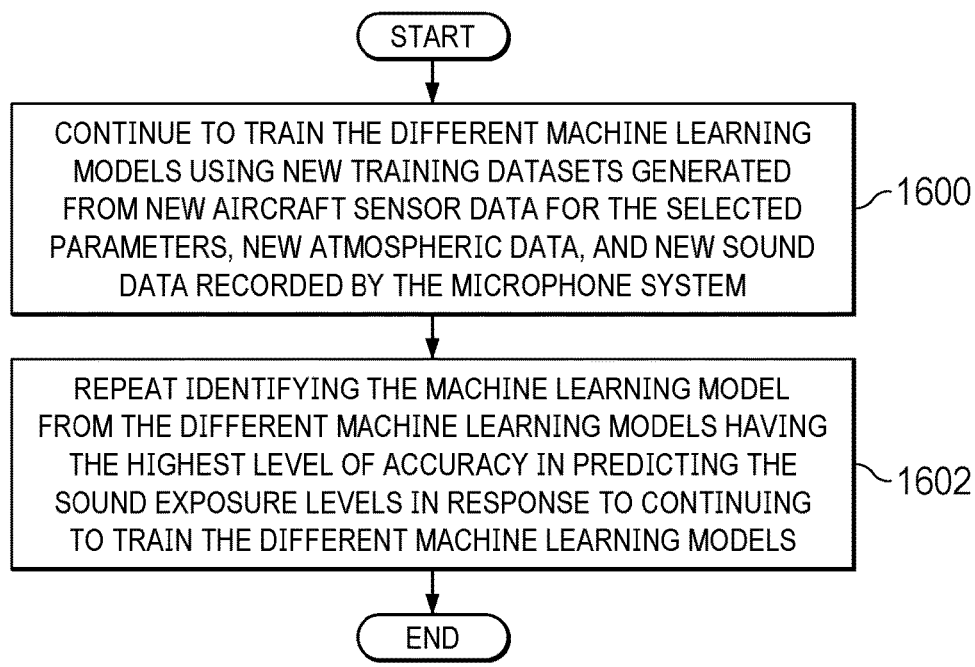
FIG. 16 is an illustration of a flowchart of a process for continuing to train different machine learning models in accordance with an illustrative embodiment.

With reference now to FIG. 16, an illustration of a flowchart of a process for continuing to train different machine learning models is depicted in accordance with an illustrative embodiment. The operations in this figure are examples of additional operations that can be used within the operations in the process in FIG. 15.

The process continues to train the different machine learning models using new training datasets generated from new aircraft sensor data for the selected parameters, new atmospheric data, and new sound data recorded by the microphone system (operation 1600). The process repeats identifying the machine learning model from the different machine learning models having the highest level of accuracy in predicting the sound exposure levels in response to continuing to train the different machine learning models (operation 1602). The process terminates thereafter.

Figure 17:
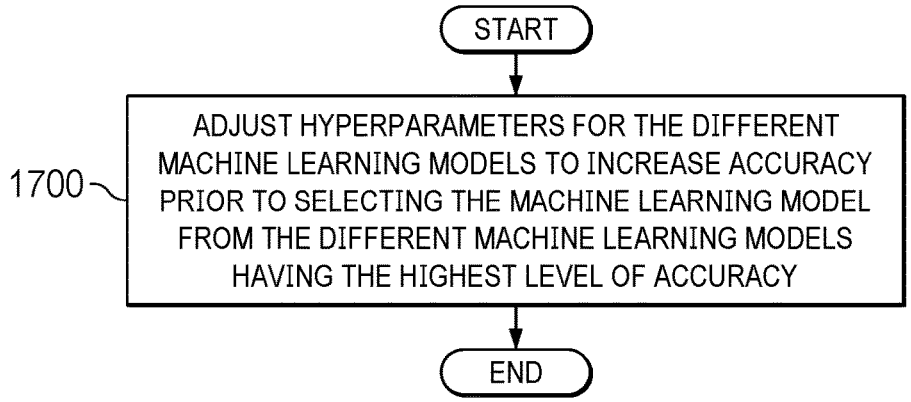
FIG. 17 is an illustration of a flowchart of a process for adjusting hyperparameters for the different machine learning models in accordance with an illustrative embodiment.

With reference now to FIG. 17, an illustration of a flowchart of a process for adjusting hyperparameters for the different machine learning models is depicted in accordance with an illustrative embodiment. The operations in this figure are examples of additional operations that can be used within the operations in the process in FIG. 15.

The process adjusts hyperparameters for the different machine learning models to increase accuracy prior to selecting the machine learning model from the different machine learning models having the highest level of accuracy (operation 1700). The process terminates thereafter.

Figure 18:
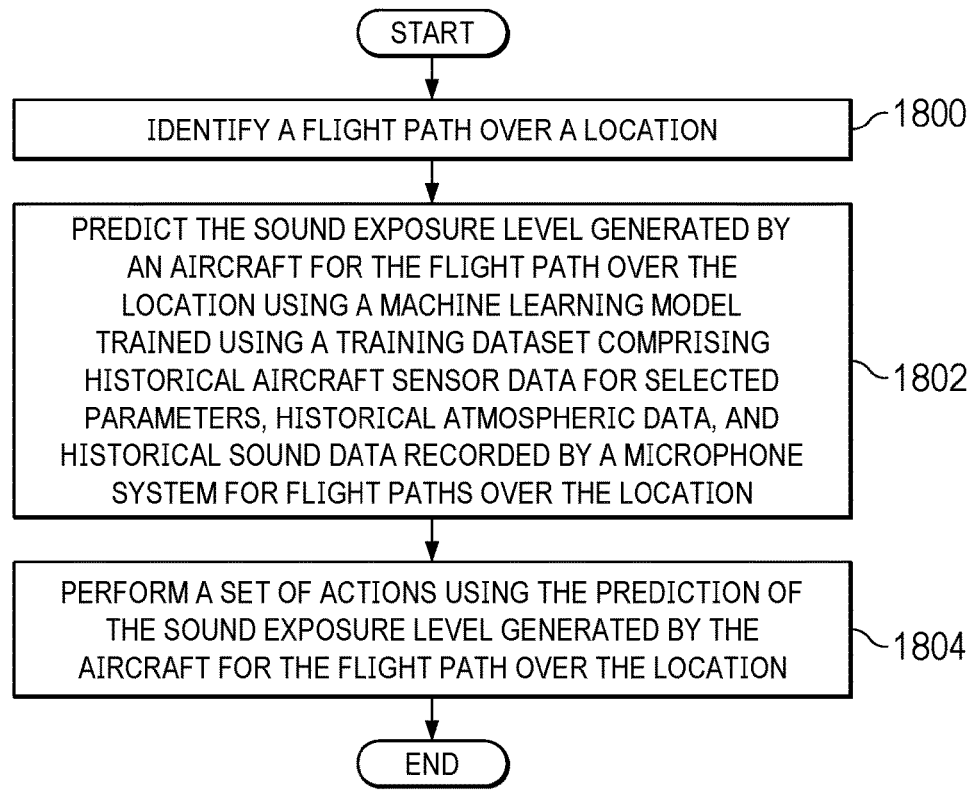
FIG. 18 is an illustration of a flowchart of a process for identifying a flight path in accordance with an illustrative embodiment.

With reference to FIG. 18, an illustration of a flowchart of a process for identifying a flight path is depicted in accordance with an illustrative embodiment. The process illustrated in FIG. 18 can be implemented using computer system 212 and controller 214 in FIG. 2. For example, the process can be implemented in controller 214 in computer system 212 in FIG. 2.

As depicted, the process begins by identifying a flight path over a location (operation 1800). The process predicts the sound exposure level generated by an aircraft for the flight path over the location using a machine learning model trained using a training dataset comprising historical aircraft sensor data for selected parameters, historical atmospheric data, and historical sound data recorded by a microphone system for flight paths over the location (operation 1802). The process performs a set of actions using a prediction of the of the sound exposure level generated by the aircraft for a flight path over the location (operation 1804). The process terminates thereafter.

Figure 19:
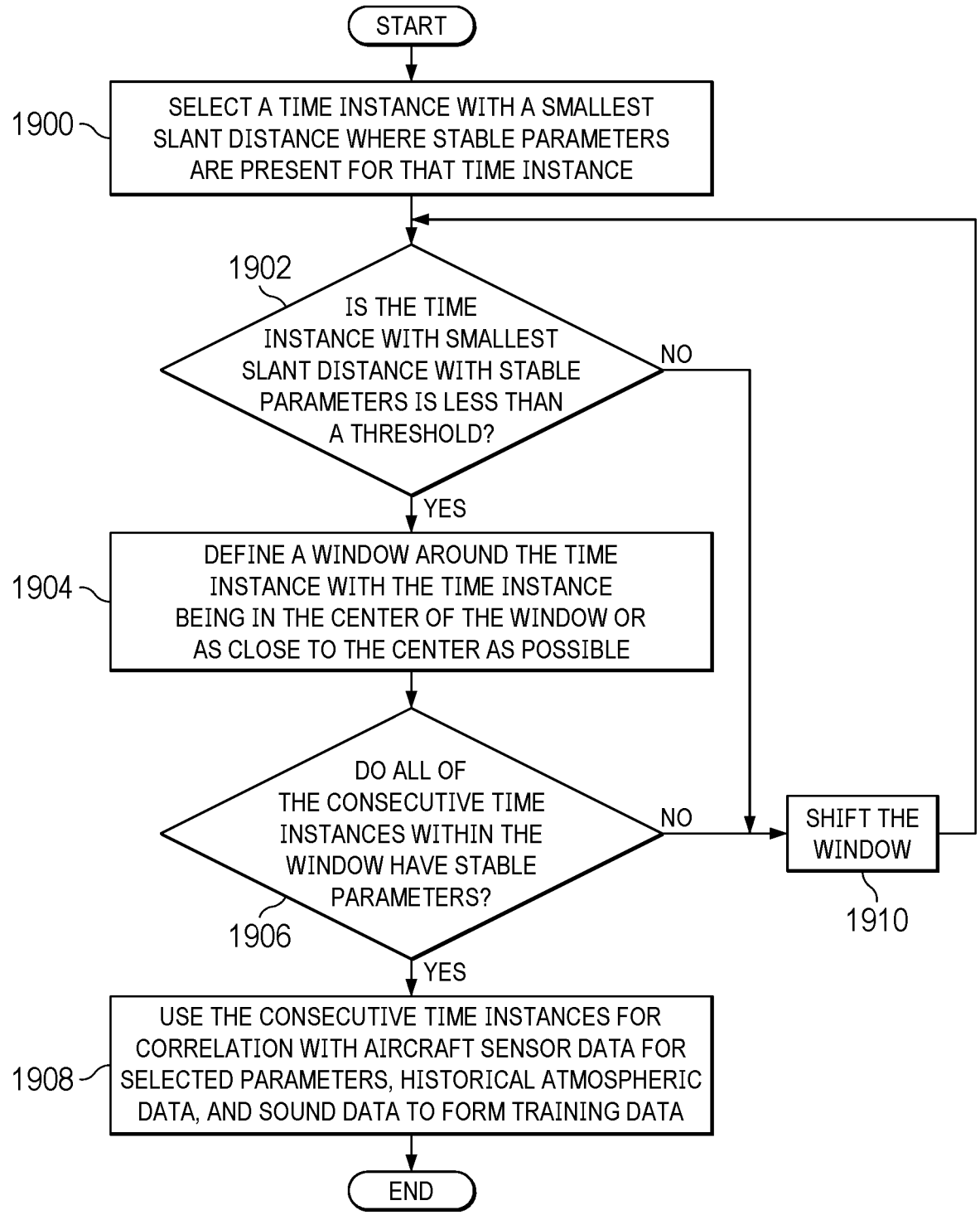
FIG. 19, an illustration of a flowchart of a process for identifying time instances for training data is depicted in accordance with an illustrative embodiment.

With reference to FIG. 19, an illustration of a flowchart of a process for identifying time instances for training data is depicted in accordance with an illustrative embodiment. The process illustrated in FIG. 19 is an example of one implementation for operation 1300 in FIG. 13.

The process begins by selecting a time instance with a smallest slant distance where stable parameters are present for that time instance (operation 1900). The process determines whether the time instance with the smallest slant distance with stable parameters is less than a threshold (operation 1902). In operation 1902, the threshold distance for the smallest slant distance with stable parameters is determined. The threshold distance can be computed using an autoregressive integrated moving average (ARIMA)-like moving average window approach.

If the smallest slant distance is less than the threshold for the slant distance, the process defines a window around the time instance with the time instance being in the center of the window or as close to the center as possible (operation 1904). The time instances within the window are consecutive time instances. The size of the window is based on the duration of the event. This duration can be received in airport data.

The process then determines whether all of the consecutive time instances within the window have stable parameters (operation 1906). If all of the consecutive time instances within window have stable parameters, the process uses the consecutive time instances for correlation with aircraft sensor data for selected parameters, historical atmospheric data, and sound data to form training data (operation 1908). The process terminates thereafter. In operation 1908, this data can be associated with a label the is the sound exposure level value.

With reference again to operation 1902, if the smallest slant distance where stable parameters are present is not less than the threshold, the process shifts the window (operation 1910) with the process then returning to operation 1902. The window can be shifted in either direction. With reference again to operation 1906, if all of the consecutive time instances within the window do not have stable parameters, the process proceeds to operation 1910.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 20:
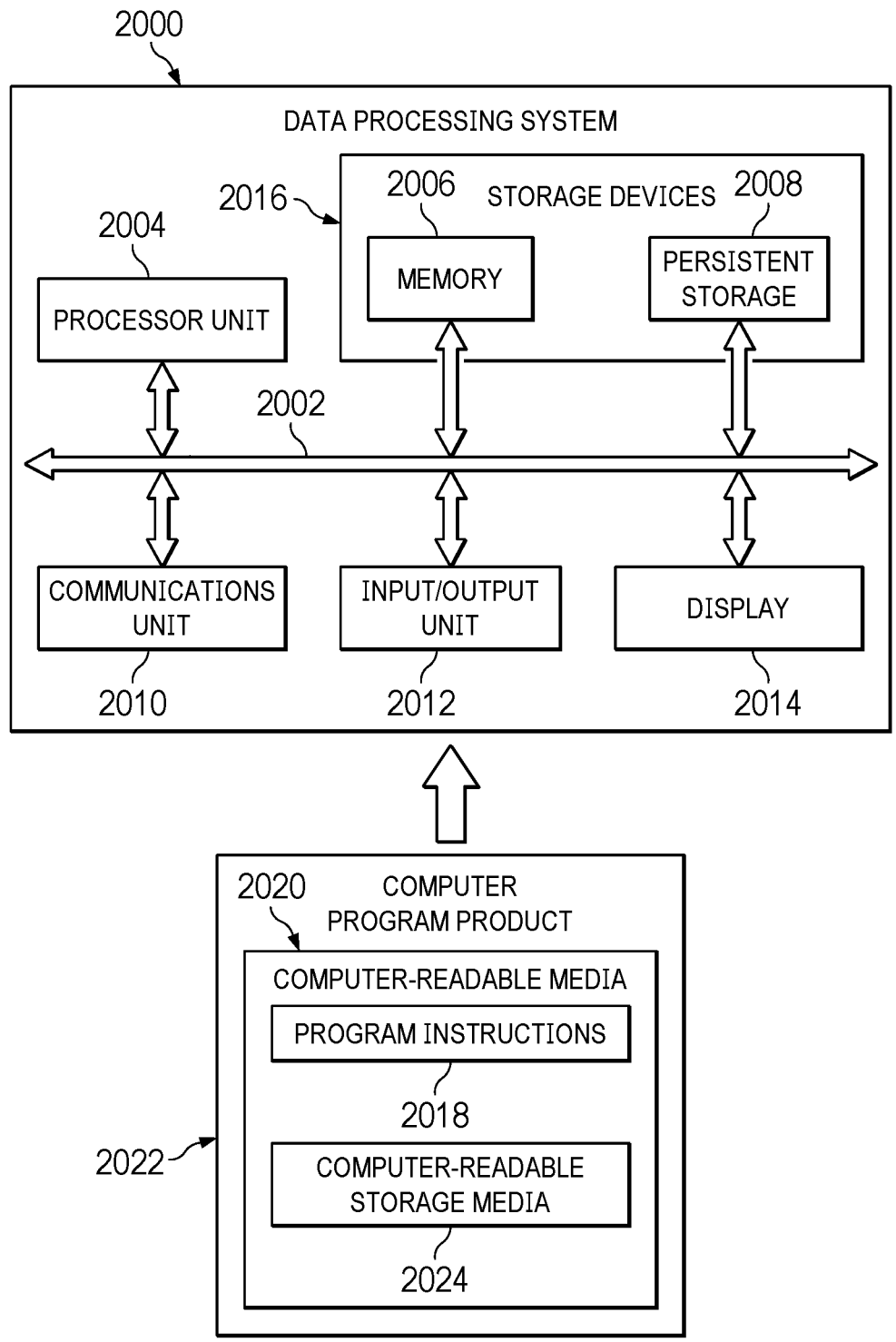
FIG. 20 is an illustration of a block diagram of a data processing system in accordance with an illustrative embodiment.

Turning now to FIG. 20, an illustration of a block diagram of a data processing system is depicted in accordance with an illustrative embodiment. Data processing system 2000 can be used to implement server computer 104, server computer 106, client devices 110, in FIG. 1. Data processing system 2000 can also be used to implement computer system 212 in FIG. 2. In this illustrative example, data processing system 2000 includes communications framework 2002, which provides communications between processor unit 2004, memory 2006, persistent storage 2008, communications unit 2010, input/output (I/O) unit 2012, and display 2014. In this example, communications framework 2002 takes the form of a bus system.

Processor unit 2004 serves to execute instructions for software that can be loaded into memory 2006. Processor unit 2004 includes one or more processors. For example, processor unit 2004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 2004 can may be implemented using one or more heterogeneous processor systems in which a main processor is present with secondary processors on a single chip. As another illustrative example, processor unit 2004 can be a symmetric multi-processor system containing multiple processors of the same type on a single chip.

Memory 2006 and persistent storage 2008 are examples of storage devices 2016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2016 may also be referred to as computer-readable storage devices in these illustrative examples. Memory 2006, in these examples, can be, for example, a random-access memory or any other suitable volatile or non-volatile storage device. Persistent storage 2008 can take various forms, depending on the particular implementation.

For example, persistent storage 2008 may contain one or more components or devices. For example, persistent storage 2008 can be a hard drive, a solid-state drive (SSD), a flash memory, a rewritable optical disk, a rewritable magnetic tape, or some combination of the above. The media used by persistent storage 2008 also can be removable. For example, a removable hard drive can be used for persistent storage 2008.

Communications unit 2010, in these illustrative examples, provides for communications with other data processing systems or devices. In these illustrative examples, communications unit 2010 is a network interface card.

Input/output unit 2012 allows for input and output of data with other devices that can be connected to data processing system 2000. For example, input/output unit 2012 can provide a connection for user input through at least one of a keyboard, a mouse, or some other suitable input device. Further, input/output unit 2012 can send output to a printer. Display 2014 provides a mechanism to display information to a user.

Instructions for at least one of the operating system, applications, or programs can be located in storage devices 2016, which are in communication with processor unit 2004 through communications framework 2002. The processes of the different embodiments can be performed by processor unit 2004 using computer-implemented instructions, which can be located in a memory, such as memory 2006.

These instructions are program instructions and are also referred to as program code, computer usable program code, or computer-readable program code that can be read and executed by a processor in processor unit 2004. The program instructions in the different embodiments can be embodied on different physical or computer-readable storage media, such as memory 2006 or persistent storage 2008.

Program instructions 2018 are located in a functional form on computer-readable media 2020 that is selectively removable and can be loaded onto or transferred to data processing system 2000 for execution by processor unit 2004. Program instructions 2018 and computer-readable media 2020 form computer program product 2022 in these illustrative examples. In the illustrative example, computer-readable media 2020 is computer-readable storage media 2024.

Computer-readable storage media 2024 is a physical or tangible storage device used to store program instructions 2018 rather than a media that propagates or transmits program instructions 2018. Computer-readable storage media 2024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 2018 can be transferred to data processing system 2000 using a computer-readable signal media. The computer-readable signal media are signals and can be, for example, a propagated data signal containing program instructions 2018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 2020" can be singular or plural. For example, program instructions 2018 can be located in computer-readable media 2020 in the form of a single storage device or system. In another example, program instructions 2018 can be located in computer-readable media 2020 that is distributed in multiple data processing systems. In other words, some instructions in program instructions 2018 can be located in one data processing system while other instructions in program instructions 2018 can be located in one data processing system. For example, a portion of program instructions 2018 can be located in computer-readable media 2020 in a server computer while another portion of program instructions 2018 can be located in computer-readable media 2020 located in a set of client computers.

The different components illustrated for data processing system 2000 are not meant to provide architectural limitations to the manner in which different embodiments can be implemented. In some illustrative examples, one or more of the components may be incorporated in or otherwise form a portion of, another component. For example, memory 2006, or portions thereof, can be incorporated in processor unit 2004 in some illustrative examples. The different illustrative embodiments can be implemented in a data processing system including components in addition to or in place of those illustrated for data processing system 2000. Other components shown in FIG. 20 can be varied from the illustrative examples shown. The different embodiments can be implemented using any hardware device or system capable of running program instructions 2018.

Some features of the illustrative examples are described in the following clauses. These clauses are examples of features not intended to limit other illustrative examples.
Clause 1

A method for predicting a sound exposure level generated by an aircraft, the method comprising:
- training a set of machine learning models to predict the sound exposure level generated by the aircraft for a flight path over a location using a training dataset comprising historical aircraft sensor data for selected parameters, historical atmospheric data, and historical sound data recorded by a microphone system for flight paths over the location; and
- predicting the sound exposure level generated by the aircraft for the flight path over the location using the set of machine learning models after training the set of machine learning models using the training dataset.

Clause 2

The method according to clause 1 further comprising:
- performing feature engineering on the historical aircraft sensor data for the selected parameters, the historical atmospheric data, and the historical sound data recorded by the microphone system to at least one of selecting relevant features, handling missing data, computing additional parameters, normalizing data, standardizing the data, or performing dimensionality reduction.

Clause 3

The method according to one of clauses 1 or 2 further comprising:
- selecting parameters that have a correlation to the sound exposure level to form correlated parameters; and
- removing the correlated parameters that are repetitive to form the selected parameters.

Clause 4

The method according to one of clauses 1, 2, or 3 further comprising:
- creating the training dataset from the historical aircraft sensor data for the selected parameters, the historical atmospheric data, and the historical sound data recorded by the microphone system for the flight paths over the location, wherein the historical sound data comprises events having sound exposure levels.

Clause 5

The method according to clause 4, wherein the training dataset comprises groups of data and wherein each group of data in the groups of data is for a flight in flights and includes the historical aircraft sensor data for the selected parameters, the historical atmospheric data, and the historical sound data recorded by the microphone system corresponding to time instances within an event having the sound exposure level for the flight.

Clause 6

The method according to clause 4, wherein creating the training dataset from the historical aircraft sensor data comprises:
- selecting a window of consecutive time instances within an event having the sound exposure level, wherein slant distances between the aircraft and a microphone are less than a threshold and the selected parameters within the window of the consecutive time instances are stable parameters; and
- correlating the historical aircraft sensor data for the selected parameters, the historical atmospheric data, and the historical sound data for the consecutive time instances in the window with the sound exposure level.

Clause 7

The method according to clause 6, wherein all of the selected parameters are the stable parameters when a moving average of each selected parameter in the selected parameters is within a moving average threshold.

Clause 8

The method according to clause 6 further comprising:
- repeating, for each microphone in the microphone system that recorded the historical sound data, selecting the window of the consecutive time instances within the event having the sound exposure level, wherein the slant distances between the aircraft and the microphone are less than the threshold and the selected parameters within the window of the consecutive time instances are the stable parameters and correlating the historical aircraft sensor data for the selected parameters, the historical atmospheric data, and the historical sound data for the consecutive time instances in the window with the sound exposure level.

Clause 9

The method according to one of clauses 1, 2, 3, 4, 5, 6, 7, or 8, wherein the set of machine learning models comprises a single machine learning model.

Clause 10

The method according to one of clauses 1, 2, 3, 4, 5, 6, 7, 8, or 9, wherein the set of machine learning models comprises different machine learning models and further comprising:
- identifying a machine learning model from the different machine learning models having a highest level of accuracy in predicting sound exposure levels, wherein the machine learning model having the highest level of accuracy is a selected machine learning model for use in predicting the sound exposure level; and
- wherein predicting the sound exposure level for the flight path of the aircraft over the location comprises:
- predicting the sound exposure level for the flight path of the aircraft over the location using the selected machine learning model.

Clause 11

The method according to clause 10 further comprising:
- continuing to train the different machine learning models using new training datasets generated from new aircraft sensor data for the selected parameters, new atmospheric data, and new sound data recorded by the microphone system; and
- repeating identifying the machine learning model from the different machine learning models having the highest level of accuracy in predicting the sound exposure levels in response to continuing to train the different machine learning models.

Clause 12

The method according to clause 10 further comprising:
- adjusting hyperparameters for the different machine learning models to increase accuracy prior to selecting the machine learning model from the different machine learning models having the highest level of accuracy.

Clause 13

The method according to clause 10, wherein the different machine learning models are selected from at least one of a linear machine learning model, a nonlinear machine learning model, an ensemble machine learning model system, or a neural network model.

Clause 14

The method according to one of clauses 1, 2, 3, 4, 5, 6, 7, 8, 9, 10, 11, 12, or 13, wherein the flight path is for one of a departing flight from an airport and an arriving flight to the airport.

Clause 15

The method according to one of clauses 1, 2, 3, 4, 5, 6, 7, 8, 9, 10, 11, 12, 13, or 14, wherein the training dataset comprises the historical aircraft sensor data for the selected parameters, the historical atmospheric data, and the historical sound data for the flight paths recorded for at least one of an aircraft model, a tail number, or an airline.

Clause 16

The method according to one of clauses 1, 2, 3, 4, 5, 6, 7, 8, 9, 10, 11, 12, 13, 14, or 15, wherein the training dataset further comprises airport data.

Clause 17

A method for predicting a sound exposure level, the method comprising:
 identifying a flight path over a location; and
 predicting the sound exposure level generated by an aircraft for the flight path over the location using a machine learning model trained using a training dataset comprising historical aircraft sensor data for selected parameters, historical atmospheric data, and historical sound data recorded by a microphone system for flight paths over the location.

Clause 18

The method according to clause 17 further comprising:
 performing a set of actions using the prediction of the sound exposure level generated by the aircraft for the flight path over the location.

Clause 19

The method according to clause 18, wherein the set of actions is selected from at least one of planning a flight over the location using the prediction of the sound exposure level generated by the aircraft for the flight path over the location, determining compliance with a regulation regarding the sound exposure level for the location, changing the flight path, logging the sound exposure level, changing a flight time for using the flight path, or identifying changes to aircraft configuration for the aircraft.

Clause 20

A machine learning system for sound exposure level prediction comprising:
 a computer system; and
 a controller in the computer system, wherein the sound exposure level predictor is configured to:
 train a set of machine learning models to predict a sound exposure level generated by an aircraft for a flight path over a location using a training dataset comprising historical aircraft sensor data for selected parameters, historical atmospheric data, and historical sound data recorded by a microphone system for flight paths over the location; and
 predict the sound exposure level generated by the aircraft for the flight path over the location using the set of machine learning models after training the set of machine learning models using the training dataset.

Clause 21

The machine learning system according to clause wherein the sound exposure level predictor is configured to:
 select the selected parameters from parameters that have a correlation to the sound exposure level to form correlated parameters; and
 remove the correlated parameters that are repetitive to form the selected parameters.

Clause 22

The machine learning system according to one of clauses 20 or 21, wherein the sound exposure level predictor is configured to:
 create the training dataset from the historical aircraft sensor data for the selected parameters, the historical atmospheric data, and the historical sound data recorded by the microphone system for the flight paths over the location, wherein the historical sound data comprises events having sound exposure levels.

Clause 23

The machine learning system according to clause 22, wherein the training dataset comprises groups of data and wherein each group of data in the groups of data is for a flight in flights and includes the historical aircraft sensor data for the selected parameters, the historical atmospheric data, and the historical sound data recorded by the microphone system corresponding to time instances for the sound exposure levels for the flight.

Clause 24

The machine learning system according to clause 22, wherein in creating the training dataset from the historical aircraft sensor data, the historical atmospheric data, and the historical sound data recorded by the microphone system for the flight paths over the location, the sound exposure level predictor is configured to:
 select a window of consecutive time instances within an event having the sound exposure level, wherein slant distances between the aircraft and a microphone are less than a threshold and the selected parameters within the window of the consecutive time instances are stable parameters; and
 correlate the historical aircraft sensor data for the selected parameters, the historical atmospheric data, and the historical sound data for the consecutive time instances in the window with the sound exposure level.

Clause 25

The machine learning system according to clause 24, wherein all of the selected parameters are the stable parameters when a moving average of each selected parameter in the selected parameters is within a moving average threshold.

Clause 26

The machine learning system according to clause 24, wherein the sound exposure level predictor is configured to:
 repeat, for each microphone in the microphone system that recorded the historical sound data, selecting the window of the consecutive time instances within the event having the sound exposure level, wherein the slant distances between the aircraft and the microphone are less than the threshold and the selected parameters within the window of the consecutive time instances are the stable parameters and correlating the historical aircraft sensor data for the selected parameters, the historical atmospheric data, and the historical sound data for the consecutive time instances in the window with the sound exposure level.

Clause 27

The machine learning system according to one of clauses 20, 21, 22, 23, 24, 25, or 26, wherein the set of machine learning models comprises a single machine learning model.

Clause 28

The machine learning system according to one of clauses 20, 21, 22, 23, 24, 25, 26, or 27, wherein the set of machine learning models comprises different machine learning models and wherein the sound exposure level predictor is configured to:
 identify a machine learning model from the different machine learning models having a highest level of accuracy in predicting sound exposure levels, wherein the machine learning model having the highest level of accuracy is a selected machine learning model for use in predicting the sound exposure level; and wherein in predicting the sound exposure level for the flight path of the aircraft over the location, the sound exposure level predictor is configured to:
predict the sound exposure level for the flight path of the aircraft over the location using the selected machine learning model.

Clause 29

The machine learning system according to clause 28, wherein the sound exposure level predictor is configured to:
continue to train the different machine learning models using new training datasets generated from new aircraft sensor data for the selected parameters, new atmospheric data, and new sound data recorded by the microphone system; and
repeat identifying the machine learning model from the different machine learning models having the highest level of accuracy in predicting the sound exposure levels in response to continuing to train the different machine learning models.

Clause 30

The machine learning system according to clause 28, wherein the different machine learning models are selected from a linear machine learning model, a nonlinear machine learning model, an ensemble machine learning model system, or a neural network model.

Clause 31

The machine learning system according to one of clauses 20, 21, 22, 23, 24, 25, 26, 27, 28, 29, or 30, wherein the flight path is for one of a departing flight from an airport and an arriving flight to the airport.

Clause 32

The machine learning system according to one of clauses 20, 21, 22, 23, 24, 25, 26, 27, 28, 29, 30, or 31, wherein the training dataset comprises the historical aircraft sensor data for the selected parameters, the historical atmospheric data, and the historical sound data for the flight paths recorded for at least one of an aircraft model, a tail number, or an airline.

Clause 33

The machine learning system according to one of clauses 20, 21, 22, 23, 24, 25, 26, 27, 28, 29, 30, 31, or 32, wherein the training dataset further comprises airport data.

Clause 34

A computer program product for predicting a sound exposure level generated by an aircraft, the computer program product comprising a computer readable storage medium having program instructions embodied therewith, the program instructions executable by a computer system to cause the computer system to perform a method of:
identifying a flight path over a location; and
predicting the sound exposure level generated by the aircraft for the flight path over the location using a machine learning model trained using a training dataset comprising historical aircraft sensor data for selected parameters, historical atmospheric data, and historical sound data recorded by a microphone system for flight paths over the location.

Thus, illustrative examples provide a method, apparatus, system, and computer program product for predicting noise in the form of sound exposure levels. The prediction of sound exposure levels is performed using a machine learning model that has been trained using historical aircraft sensor data for selected parameters, historical atmospheric data, and historical sound data reported by microphone system for flight paths over a location. In these illustrative examples, a prediction of a sound exposure level can be made for a flight path over the location.

With these predictions with increased accuracy in predicting sound exposure levels, airlines can plan flight path can reduce undesired noise in areas over and around an airport. Further, air navigation service providers (ANSPs) can more easily enforce noise-reduced arrival and departure procedures and penalizing airlines for their flights that produce noise above mandated thresholds for sound exposure levels. With more accurate predictions using machine learning models, meeting thresholds for noise levels can occur more easily for airlines.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for predicting a sound exposure level generated by an aircraft, the method comprising:
creating a training dataset from historical aircraft sensor data for: selected parameters, historical atmospheric data, and historical sound data recorded by a microphone system, for flight paths over a location, wherein the historical sound data comprises events comprising sound exposure levels, wherein the training dataset comprises groups of data and wherein each group of data in the groups of data is for a flight path in the flight paths and includes the historical aircraft sensor data for the selected parameters, the historical atmospheric data, and the historical sound data recorded by the microphone system corresponding to time instances within an event having the sound exposure level for the flight path, wherein creating the training dataset from the historical aircraft sensor data comprises:
selecting a window of consecutive time instances within an event having the sound exposure level, wherein:
slant distances between the aircraft and a microphone are less than a threshold; and
the selected parameters within the window of the consecutive time instances are stable parameters; having a moving average of each selected parameter in the selected parameters within a moving average threshold; and
correlating the historical aircraft sensor data for the selected parameters, the historical atmospheric data, and the historical sound data for the consecutive time instances in the window with the sound exposure level;

training a set of machine learning models to predict the sound exposure level generated by the aircraft for the flight path over the location using the training dataset; and predicting the sound exposure level generated by the aircraft for the flight path over the location using the set of machine learning models after training the set of machine learning models using the training dataset.

2. The method of claim 1 further comprising:
performing feature engineering on the historical aircraft sensor data for the selected parameters, the historical atmospheric data, and the historical sound data recorded by the microphone system to at least one of selecting relevant features, handling missing data, computing additional parameters, normalizing data, standardizing the data, or performing dimensionality reduction.

3. The method of claim 1, further comprising:
selecting parameters that have a correlation to the sound exposure level to form correlated parameters; and
removing the correlated parameters that are repetitive to form the selected parameters.

4. The method of claim 1, wherein the training dataset comprises groups of data and wherein each group of data in the groups of data is for a flight in flights and includes the historical aircraft sensor data for the selected parameters, the historical atmospheric data, and the historical sound data recorded by the microphone system corresponding to time instances within an event having the sound exposure level for the flight.

5. The method of claim 1, further comprising:
repeating, for each microphone in the microphone system that recorded the historical sound data, selecting the window of the consecutive time instances within the event having the sound exposure level, wherein the slant distances between the aircraft and the microphone are less than the threshold and the selected parameters within the window of the consecutive time instances are the stable parameters and correlating the historical aircraft sensor data for the selected parameters, the historical atmospheric data, and the historical sound data for the consecutive time instances in the window with the sound exposure level.

6. The method of claim 1, wherein the set of machine learning models comprises a single machine learning model.

7. The method of claim 1, wherein the set of machine learning models comprises different machine learning models and further comprising:
identifying a machine learning model from the different machine learning models having a highest level of accuracy in predicting sound exposure levels, wherein the machine learning model having the highest level of accuracy is a selected machine learning model for use in predicting the sound exposure level; and
wherein predicting the sound exposure level for the flight path of the aircraft over the location comprises:
predicting the sound exposure level for the flight path of the aircraft over the location using the selected machine learning model.

8. The method of claim 7 further comprising:
continuing to train the different machine learning models using new training datasets generated from new aircraft sensor data for the selected parameters, new atmospheric data, and new sound data recorded by the microphone system; and
repeating identifying the machine learning model from the different machine learning models having the highest level of accuracy in predicting the sound exposure levels in response to continuing to train the different machine learning models.

9. The method of claim 7 further comprising:
adjusting hyperparameters for the different machine learning models to increase accuracy prior to selecting the machine learning model from the different machine learning models having the highest level of accuracy.

10. The method of claim 7, wherein the different machine learning models are selected from at least one of a linear machine learning model, a nonlinear machine learning model, an ensemble machine learning model system, or a neural network model.

11. The method of claim 1, wherein the flight path is for one of a departing flight from an airport and an arriving flight to the airport.

12. The method of claim 1, wherein the training dataset comprises the historical aircraft sensor data for the selected parameters, the historical atmospheric data, and the historical sound data for the flight paths recorded for at least one of an aircraft model, a tail number, or an airline.

13. The method of claim 1, wherein the training dataset further comprises airport data.

14. A method for predicting a sound exposure level, the method comprising:
creating a training dataset from historical aircraft sensor data for: selected parameters, historical atmospheric data, and historical sound data recorded by a microphone system, for flight paths over a location, wherein the historical sound data comprises events comprising sound exposure levels, wherein the training dataset comprises groups of data and wherein each group of data in the groups of data is for a flight path in the flight paths and includes the historical aircraft sensor data for the selected parameters, the historical atmospheric data, and the historical sound data recorded by the microphone system corresponding to time instances within an event having the sound exposure level for the flight path, wherein creating the training dataset from the historical aircraft sensor data comprises:
selecting a window of consecutive time instances within an event having the sound exposure level, wherein:
slant distances between an aircraft and a microphone are less than a threshold; and
the selected parameters within the window of the consecutive time instances are stable parameters;
having a moving average of each selected parameter in the selected parameters within a moving average threshold; and
correlating the historical aircraft sensor data for the selected parameters, the historical atmospheric data, and the historical sound data for the consecutive time instances in the window with the sound exposure level;
identifying a flight path over a location; and
predicting the sound exposure level generated by an aircraft for the flight path over the location using a machine learning model trained using a training dataset comprising historical aircraft sensor data for selected parameters, historical atmospheric data, and historical sound data recorded by a microphone system for flight paths over the location.

15. The method of claim 14 further comprising:
performing a set of actions using a prediction of the sound exposure level generated by the aircraft for the flight path over the location.

16. The method of claim 15, wherein the set of actions is selected from at least one of planning a flight over the location using the prediction of the sound exposure level generated by the aircraft for the flight path over the location, determining compliance with a regulation regarding the sound exposure level for the location, changing the flight path, logging the sound exposure level, changing a flight time for using the flight path, or identifying changes to aircraft configuration for the aircraft.

17. A machine learning system configured to predict sound exposure level prediction, wherein the machine learning system comprises:
a computer system configured to:
create a training dataset from historical aircraft sensor data for: selected parameters, historical atmospheric data, and historical sound data recorded by a microphone system, for flight paths over a location, wherein the historical sound data comprises events comprising sound exposure levels, wherein the training dataset comprises groups of data and wherein each group of data in the groups of data is for a flight path in the flight paths and includes the historical aircraft sensor data for the selected parameters, the historical atmospheric data, and the historical sound data recorded by the microphone system corresponding to time instances within an event having the sound exposure level for the flight path, wherein to create the training dataset from the historical aircraft sensor data the computer system is configured to:
select a window of consecutive time instances within an event having the sound exposure level, wherein:
slant distances between an aircraft and a microphone are less than a threshold; and
the selected parameters within the window of the consecutive time instances are stable parameters; having a moving average of each selected parameter in the selected parameters within a moving average threshold; and
correlate the historical aircraft sensor data for the selected parameters, the historical atmospheric data, and the historical sound data for the consecutive time instances in the window with the sound exposure level; and
a sound exposure level predictor in the computer system, wherein the sound exposure level predictor is configured to:
train a set of machine learning models to predict a sound exposure level generated by an aircraft for a flight path over a location using the training dataset; and
predict the sound exposure level generated by the aircraft for the flight path over the location using the set of machine learning models after training the set of machine learning models using the training dataset.

18. The machine learning system of claim 17, wherein the sound exposure level predictor is configured to:

select the selected parameters from parameters that have a correlation to the sound exposure level to form correlated parameters; and
remove the correlated parameters that are repetitive to form the selected parameters.

19. The machine learning system of claim 17, wherein the training dataset comprises groups of data and wherein each group of data in the groups of data is for a flight in flights and includes the historical aircraft sensor data for the selected parameters, the historical atmospheric data, and the historical sound data recorded by the microphone system corresponding to time instances for the sound exposure levels for the flight.

20. The machine learning system of claim 17, wherein the sound exposure level predictor is configured to:
repeat, for each microphone in the microphone system that recorded the historical sound data, selecting the window of the consecutive time instances within the event having the sound exposure level, wherein the slant distances between the aircraft and the microphone are less than the threshold and the selected parameters within the window of the consecutive time instances are the stable parameters and correlating the historical aircraft sensor data for the selected parameters, the historical atmospheric data, and the historical sound data for the consecutive time instances in the window with the sound exposure level.

21. The machine learning system of claim 17, wherein the set of machine learning models comprises a single machine learning model.

22. The machine learning system of claim 17, wherein the set of machine learning models comprises different machine learning models and wherein the sound exposure level predictor is configured to:
identify a machine learning model from different machine learning models that comprise a highest level of accuracy in prediction of sound exposure levels, wherein the machine learning model that comprises the highest level of accuracy is a selected machine learning model for use in prediction of the sound exposure level; and
wherein the sound exposure level predictor is configured to:
predict the sound exposure level for the flight path of the aircraft over the location using the selected machine learning model.

23. The machine learning system of claim 22, wherein the sound exposure level predictor is configured to:
continue to train the different machine learning models using new training datasets generated from new aircraft sensor data for the selected parameters, new atmospheric data, and new sound data recorded by the microphone system; and
repeat identifying the machine learning model from the different machine learning models having the highest level of accuracy in predicting the sound exposure levels in response to continuing to train the different machine learning models.

24. The machine learning system of claim 22, wherein the different machine learning models are selected from a linear machine learning model, a nonlinear machine learning model, an ensemble machine learning model system, or a neural network model.

25. The machine learning system of claim 17, wherein the flight path is for one of a departing flight from an airport and an arriving flight to the airport.

26. The machine learning system of claim 17, wherein the training dataset comprises the historical aircraft sensor data for the selected parameters, the historical atmospheric data, and the historical sound data for the flight paths recorded for at least one of an aircraft model, a tail number, or an airline.

27. The machine learning system of claim 17, wherein the training dataset further comprises airport data.

28. A computer program product configured to predict a sound exposure level generated by an aircraft, wherein the computer program product comprises a computer readable storage medium that comprises program instructions embodied therewith, wherein the program instructions are configured for execution by a computer system to perform a method of:

creating a training dataset from historical aircraft sensor data for: selected parameters, historical atmospheric data, and historical sound data recorded by a microphone system, for flight paths over a location, wherein the historical sound data comprises events comprising sound exposure levels, wherein the training dataset comprises groups of data and wherein each group of data in the groups of data is for a flight path in the flight paths and includes the historical aircraft sensor data for the selected parameters, the historical atmospheric data, and the historical sound data recorded by the microphone system corresponding to time instances within an event having the sound exposure level for the flight path, wherein creating the training dataset from the historical aircraft sensor data comprises:

selecting a window of consecutive time instances within an event having the sound exposure level, wherein:
slant distances between the aircraft and a microphone are less than a threshold; and
the selected parameters within the window of the consecutive time instances are stable parameters; having a moving average of each selected parameter in the selected parameters within a moving average threshold; and
correlating the historical aircraft sensor data for the selected parameters, the historical atmospheric data, and the historical sound data for the consecutive time instances in the window with the sound exposure level;

identifying a flight path over a location; and predicting the sound exposure level generated by the aircraft for the flight path over the location using a machine learning model trained using the training dataset comprising historical aircraft sensor data for selected parameters, historical atmospheric data, and historical sound data recorded by a microphone system for flight paths over the location.

* * * * *